(12) United States Patent
Hosoi

(10) Patent No.: US 9,817,218 B2
(45) Date of Patent: Nov. 14, 2017

(54) ZOOM LENS AND IMAGING APPARATUS

(71) Applicant: SONY CORPORATION, Tokyo (JP)

(72) Inventor: Masaharu Hosoi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/629,703

(22) Filed: Feb. 24, 2015

(65) Prior Publication Data

US 2015/0253550 A1 Sep. 10, 2015

(30) Foreign Application Priority Data

Mar. 4, 2014 (JP) ................. 2014-041750

(51) Int. Cl.
*G02B 15/14* (2006.01)
*G02B 15/177* (2006.01)
*G02B 27/64* (2006.01)
*H04N 5/232* (2006.01)

(52) U.S. Cl.
CPC .......... *G02B 15/177* (2013.01); *G02B 15/14* (2013.01); *G02B 27/646* (2013.01); *H04N 5/23296* (2013.01)

(58) Field of Classification Search
CPC ........ G02B 15/00; G02B 15/14; G02B 15/15; G02B 15/16; G02B 15/177; G02B 15/20; G02B 27/64; G02B 27/646
See application file for complete search history.

(56) References Cited

U.S. PATENT DOCUMENTS

| 4,756,609 | A | * | 7/1988 | Estelle | G02B 15/20 359/686 |
|---|---|---|---|---|---|
| 5,111,338 | A | * | 5/1992 | Nakayama | G02B 15/177 359/685 |
| 5,523,888 | A | * | 6/1996 | Nishio | G02B 15/177 359/686 |
| 5,793,532 | A | * | 8/1998 | Kawamura | G02B 15/177 359/686 |
| 6,606,201 | B1 | * | 8/2003 | Hirose | G02B 15/177 359/676 |
| 7,911,697 | B2 | * | 3/2011 | Ohtake | G02B 15/173 359/557 |
| 2007/0229967 | A1 | * | 10/2007 | Nagahara | G02B 15/177 359/676 |
| 2008/0151382 | A1 | * | 6/2008 | Kawana | G02B 15/177 359/650 |
| 2010/0194930 | A1 | * | 8/2010 | Miyazaki | G02B 15/177 348/240.3 |
| 2011/0013151 | A1 | * | 1/2011 | Nagahara | G02B 15/177 353/101 |

FOREIGN PATENT DOCUMENTS

| JP | 2005-106878 A | 4/2005 |
|---|---|---|
| JP | 2010-176097 A | 8/2010 |

* cited by examiner

*Primary Examiner* — Thong Nguyen
(74) *Attorney, Agent, or Firm* — Chip Law Group

(57) ABSTRACT

A zoom lens includes, in order from an object side, a first lens group having a negative refractive power, a second lens group having a positive refractive power, a third lens group having a positive refractive power, and a fourth lens group having a negative refractive power, the fourth lens group having at least two positive lenses, the zoom lens satisfying a conditional expression (a) of $-2.0 < f3/f4 < -0.35$ where f3 indicates a focal length of the third lens group and f4 indicates a focal length of the fourth lens group.

11 Claims, 21 Drawing Sheets

ZOOM LENS AND IMAGING APPARATUS

CROSS REFERENCE TO RELATED APPLICATIONS

This application claims the benefit of priority under 35 U.S.C. §119 from Japanese Priority Patent Application JP 2014-041750 filed Mar. 4, 2014, the entire contents of each which is incorporated herein by reference.

BACKGROUND

The present technology relates to a zoom lens and an imaging apparatus. More particularly, the present technology relates to a wide-angle zoom lens suitable for an imaging lens system of a lens-interchangeable camera system and an imaging apparatus using the wide-angle zoom lens.

In recent years, a lens-interchangeable digital camera system has rapidly become widespread. In particular, a lens-interchangeable digital camera system that does not include any quick-return mirror in a main body of the camera, which is called a mirrorless digital camera, has been attracting attention. The mirrorless camera system have the common feature that a distance (back focus) between a lens arranged closest to an image side and an imaging element is shorter than that of a reflex camera system of the related art. The mirrorless camera system can make the back focus shorter than a lens for the reflex camera system of the related art, so that there is a demand that an imaging lens, particularly, a wide-angle lens makes the entire optical length shorter than the lens for the reflex camera.

As such a wide-angle lens, there has been proposed a wide-angle zoom lens including, in order from an object side, a negative first lens group, a positive second lens group, a positive third lens group, and a negative fourth lens group (for example, see Japanese Patent Application Laid-open Nos. 2010-176097 and 2005-106878).

SUMMARY

In the aforementioned related arts, a negative power of the fourth lens group is weak, which fails to shorten the back focus sufficiently. Therefore, this leads to a problem that applying the lenses of these related arts to imaging lenses for a mirrorless camera makes an entire length of a lens barrel long due to a long back focus.

The present technology has been made in view of the above circumstance, and it is desirable to provide a compact wide-angle zoom lens while maintaining high imaging performance.

According to a first embodiment of the present technology, there is provided a zoom lens including: in order from an object side, a first lens group having a negative refractive power; a second lens group having a positive refractive power; a third lens group having a positive refractive power; and a fourth lens group having a negative refractive power, the fourth lens group having at least two positive lenses, the zoom lens satisfying a conditional expression (a) of $-2.0<f3/f4<-0.35$ where f3 is a focal length of the third lens group, and f4 is a focal length of the fourth lens group.

According to a second embodiment of the present technology, there is provided a zoom lens including: in order from an object side, a first lens group having a negative refractive power; a second lens group having a positive refractive power; a third lens group having a positive refractive power; and a fourth lens group having a negative refractive power, the fourth lens group having one positive lens, the zoom lens satisfying a conditional expression (a1) of $-2.0<f3/f4<-0.40$ where f3 is a focal length of the third lens group, and f4 is a focal length of the fourth lens group.

Moreover, in the first and second embodiments, a conditional expression (b) of $0.4<f2/f3<1.5$ may be satisfied where f2 is a focal length of the second lens group.

Moreover, in the first and second embodiments, a conditional expression (c) of $-0.4<(r1p+r2p)/(r1p-r2p)<0.4$ may be satisfied where r1p is a radius of curvature of a surface of the object side of a positive lens arranged closest to an image surface side of the fourth lens group, and r2p is a radius of curvature of the surface of the image surface side of the positive lens arranged closest to the image surface side of the fourth lens group.

Moreover, in the first and second embodiments, all lens groups may be moved in an optical axis direction upon zooming from a wide-angle end state to a telephoto end state.

Moreover, in the first and second embodiments, the fourth lens group may include a negative lens, a positive lens, a positive lens, and a negative lens in order from the object side. Meanwhile, the fourth lens group may include a negative lens, a positive lens, a positive lens, a positive lens, and a negative lens in order from the object side.

Moreover, according to a third embodiment of the present technology, there is provided an imaging apparatus including a zoom lens, and an imaging element configured to convert an optical image formed by the zoom lens into an electric signal, the zoom lens including, in order from an object side, a first lens group having a negative refractive power, a second lens group having a positive refractive power, a third lens group having a positive refractive power, and a fourth lens group having a negative refractive power, the fourth lens group having at least two positive lenses, the zoom lens satisfying a conditional expression (a) of $-2.0<f3/f4<-0.35$ where f3 is a focal length of the third lens group, and f4 is a focal length of the fourth lens group.

According to an embodiment of the present technology, it is possible to obtain an excellent effect of achieving a compact wide-angle zoom lens having a short back focus while maintaining high imaging performance. It should be noted that the present technology is not limited to the effects described here and may achieve any one of the effects described in the present disclosure.

These and other objects, features and advantages of the present disclosure will become more apparent in light of the following detailed description of best mode embodiments thereof, as illustrated in the accompanying drawings.

DETAILED DESCRIPTION OF EMBODIMENTS

Figure 1:
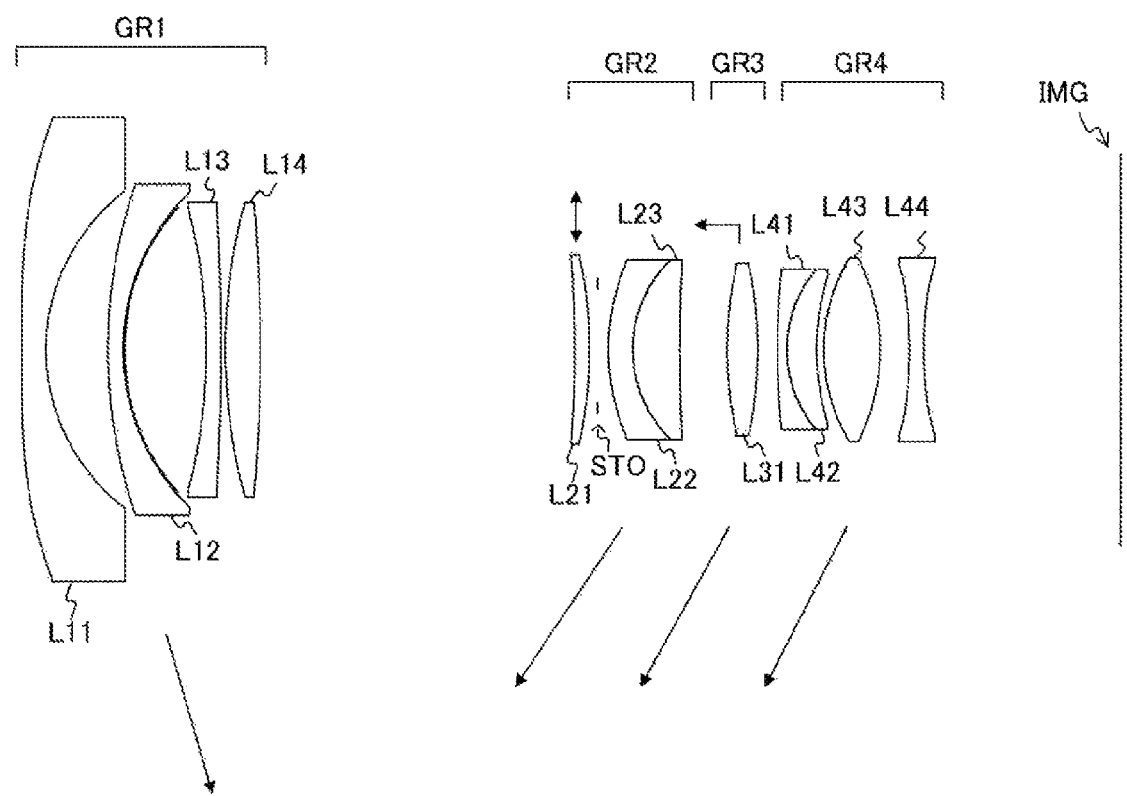
FIG. 1 is a diagram showing a lens configuration of a zoom lens according to a first embodiment of the present technology.

Embodiments for carrying out the present technology (hereinafter referred to as embodiments) will be described below.

A zoom lens according to an embodiment of the present technology includes: in order from an object side, a first lens group having a negative refractive power; a second lens group having a positive refractive power; a third lens group having a positive refractive power; and a fourth lens group having a negative refractive power, the fourth lens group having at least two positive lenses, the zoom lens satisfying a conditional expression (a) of $-2.0<f3/f4<-0.35$ where f3 indicates a focal length of the third lens group, and f4 indicates a focal length of the fourth lens group.

In the zoom lens according to an embodiment of the present technology, the fourth lens group has two or more positive lenses, which allows two positive lenses to suitably correct magnification a chromatic aberration and a coma aberration generated in the fourth lens group.

Conditional expression (a) defines the focal length of the third lens group with respect to the focal length of the fourth lens group. When the focal length is below the range represented in the conditional expression (a), a negative power of the fourth lens group becomes too strong, so that various aberrations generated in the fourth lens group, particularly, the magnification chromatic aberration and the coma aberration are deteriorated, thereby failing to maintain high imaging performance. Moreover, when the focal length is above the range represented in the conditional expression (a), the negative power of the fourth lens group becomes too weak, thereby failing to sufficiently reduce the back focus.

It should be noted that the zoom lens according to an embodiment of the present technology desirably sets a numerical range of the conditional expression (a) to a numerical range of the following conditional expression (a'). Setting the range of the conditional expression (a') allows for achieving a compact zoom lens with higher performance.

$-1.7<f3/f4<-0.43$      Conditional expression (a')

The zoom lens according to an embodiment of the present technology desirably satisfies a conditional expression (b) of $0.4<f2/f3<1.5$ where f2 indicates a focal length of the second lens group.

The conditional expression (b) is an expression which defines the focal length of the second lens group with respect the third lens group. When the focal length is below the range represented in the conditional expression (b), a positive power of the second lens group with respect the third lens group becomes too strong, so that a fluctuation in aberrations at the time of zooming, particularly, a variation in a spherical aberration increases, thereby failing to ensure suitable imaging performance. When the focal length is above the upper limit of the conditional expression (b), a positive power of the third lens group with respect the second lens group becomes too strong, so that various aberrations generated in the third lens group, particularly, the spherical aberration and an axial chromatic aberration are deteriorated.

It should be noted that the zoom lens according to an embodiment of the present technology desirably sets a numerical range of the conditional expression (b) to a numerical range of the following conditional expression (b'). Setting the range of the conditional expression (b') allows for ensuring more suitable imaging performance.

$0.44<f2/f3<1.35.$      Conditional expression (b')

The zoom lens according to an embodiment of the present technology desirably satisfies a conditional expression (c) of $-0.4<(r1p+r2p)/(r1p-r2p)<0.4$ where r1p indicates a radius of curvature of a surface of the object side of the positive lens arranged closest to an image surface side of the fourth lens group and r2p indicates a radius of curvature of a surface of the image surface side of the positive lens arranged closest to the image surface side of the fourth lens group.

The conditional expression (c) defines a shape factor of the positive lens arranged closest to the image surface side of the fourth lens group. When the shape factor is below the range represented in the conditional expression (c), the surface of the object side is a steeply convex surface, so that off-axial marginal ray enters a convex surface of the object side at a large angle, thereby increasing a coma aberration. When the shape factor is above the range represented in the conditional expression (c), the surface of the image surface side is a convex surface with a steep curvature, so that an angle of deviation of the off-axial marginal ray in the image surface side increases, thereby increasing a coma aberration.

It should be noted that the zoom lens according to an embodiment of the present technology desirably sets a numerical range of the conditional expression (c) to a numerical range of the following conditional expression (c'). Setting the range of the conditional expression (c') allows for ensuring more suitable imaging performance.

$$-0.3 < (r1p+r2p)/(r1p-r2p) < 0.3 \quad \text{Conditional expression (c')}$$

In the zoom lens according to an embodiment of the present technology, all lens groups are desirably moved in an optical axis direction upon zooming from a wide-angle end state to a telephoto end state.

In the zoom lens according to an embodiment of the present technology, the fourth lens group desirably includes a negative lens, a positive lens, a positive lens, and a negative lens in order from an object side. The negative lens arranged closest to an image side can raise the off-axial ray and shorten the back focus. Moreover, two positive lenses are sandwiched between two negative lenses. This configuration can effectively improve various aberrations generated in the fourth lens group, particularly, the coma aberration and the magnification chromatic aberration.

The zoom lens according to an embodiment of the present technology may include a negative lens, a positive lens, a positive lens, a positive lens and a negative lens in order from an object side.

Moreover, in the zoom lens according to an embodiment of the present technology, the fourth lens group may have one positive lens. In this case, the zoom lens desirably sets the numerical range of the conditional expression (a) to a numerical range of a conditional expression (a1) of −2.0<f3/f4<−0.40

Hereinafter, numerical examples according to embodiments of the present technology will be described. The description will be given in the following order:

1. First embodiment (numerical example 1)
2. Second embodiment (numerical example 2)
3. Third embodiment (numerical example 3)
4. Fourth embodiment (numerical example 4)
5. Fifth embodiment (numerical example 5)
6. Application Example (imaging apparatus)

It should be noted that meanings or the like of reference symbols which will be shown hereinafter in tables and the descriptions are as follows. That is, "si" represents a surface number which represents the i-th surface counted from the object side. "ri" represents a radius of curvature of the i-th surface counted from the object side. "di" represents an on-axis surface spacing between the i-th surface and the i+1-th surface counted from the object side. "ni" represents a refractive index of a raw material or a glass material, of which the object side is the i-th surface, at the d-line (a wavelength of 587.6 nm). "vi" represents an Abbe number of the raw material or the glass material, of which the object side is the i-th surface, at the d-line. In addition, in terms of the radius of curvature, "∞" represents that the surface is flat. Moreover, "ASP" of columns of the surface number represents that the surface is constituted of an aspherical shape.

Moreover, "f" represents the focal length of the entire lens system. "Fno" represents an open F value (F-number). "ω" represents a half angle of view.

Moreover, in lenses used in the embodiments, some lens surfaces are constituted of aspherical shapes as described above. Assuming that a distance (sag amount) from the vertex of the lens surface in the optical axis direction is "x", a height thereof in the direction perpendicular to the optical axis is "y", a paraxial curvature at the lens vertex is "c", and conic constant is "κ", the following expression can be established.

$$x = y^2 c^2 / (1 + (1-(1+\kappa)y^2 c^2)^{1/2}) + A4y^4 + A6y^6 + A8y^8 + A10y^{10} + A12y^{12}$$

It should be noted that A4, A6, A8, A10 and A12 are 4th-order, 6th-order, 8th-order, 10th-order and 12th-order aspherical coefficients.

1. First Embodiment

[Lens Configuration]

FIG. 1 is a diagram showing a lens configuration of a zoom lens according to a first embodiment of the present technology.

The zoom lens according to the first embodiment includes a first lens group GR1, a second lens group GR2, a third lens group GR3, and a fourth lens group GR4, arranged in order from an object side to an image surface IMG. The first lens group GR1 has a negative refractive power. The second lens group GR2 has a positive refractive power. The third lens group GR3 has a positive refractive power. The fourth lens group GR4 has a negative refractive power.

The first lens group GR1 includes a negative meniscus lens L11, a negative meniscus lens L12, a negative meniscus lens L13, and a biconvex lens L14, arranged in order from the object side. The negative meniscus lens L11 is a lens using aspherical surfaces for both surfaces with a convex surface facing to the object side. The negative meniscus lens L12 is a lens with a convex surface facing to the object side. This negative meniscus lens L12 is formed by attaching aspherical resin to a spherical surface of an image surface side. The negative meniscus lens L13 is a lens with a concave surface facing to the object side. The biconvex lens L14 is a lens having convex surfaces on both surfaces.

The second lens group GR2 includes a positive meniscus lens L21, a negative meniscus lens L22, and a positive meniscus lens L23, arranged in order from the object side. The positive meniscus lens L21 is a lens with a convex surface facing to the image side. The negative meniscus lens L22 is a lens using an aspherical surface for a surface of the object side with a convex surface facing to the object side. The positive meniscus lens L23 is a lens which faces a convex surface to the object side. The negative meniscus lens L22 and the positive meniscus lens L23 are bonded to each other to form a cemented lens.

The third lens group GR3 is constituted of a biconvex lens L31 having convex surfaces on both surfaces using aspherical surfaces at both sides.

The fourth lens group GR4 includes a negative meniscus lens L41, a positive meniscus lens L42, a biconvex lens L43, and a biconcave lens L44, arranged in order from the object side. The negative meniscus lens L41 is a lens with a convex surface facing to the object side. The positive meniscus lens L42 is a lens with a convex surface facing to the object side. The negative meniscus lens L41 and the positive meniscus lens L42 are bonded to each other to form a cemented lens. The biconvex lens L43 is a lens having convex surfaces on both surfaces. The biconcave lens L44 is a lens having concave surfaces on both surfaces using aspherical surfaces on surfaces at both sides.

In the zoom lens according to the first embodiment, all lens groups are moved in an optical axis direction upon zooming from a wide-angle end state to a telephoto end state.

Moreover, focusing from infinity to a near side is performed by moving the third lens group GR3 in the optical axis direction.

Upon occurrence of a hand-shake vibration, the positive meniscus lens L21 arranged closest to the object side of the second lens group GR2 as a vibration-proof lens is moved in a direction perpendicular to the optical axis, thereby correcting image blurring.

It should be noted that a stop STO is arranged between the positive meniscus lens L21 and the negative meniscus lens L22 in the second lens group GR2.

Specification of Zoom Lens

Table 1 shows lens data of a numerical example 1 in which specific numerical values are applied to the zoom lens according to the first embodiment.

| si | ri | di | ni | vi |
|---|---|---|---|---|
| 1(ASP) | 1500.000 | 2.800 | 1.77173 | 49.20 |
| 2(ASP) | 22.170 | 7.193 | | |
| 3 | 57.806 | 1.300 | 1.83945 | 42.70 |
| 4 | 25.233 | 0.150 | 1.53699 | 41.70 |
| 5(ASP) | 28.164 | 9.466 | | |
| 6 | −63.675 | 1.700 | 1.80831 | 46.50 |
| 7 | −275.715 | 0.500 | | |
| 8 | 64.870 | 4.067 | 2.00912 | 29.10 |
| 9 | −187.494 | (d9) | | |
| 10 | −119.397 | 1.700 | 1.57124 | 56.00 |
| 11 | −49.774 | 0.900 | | |
| 12(Stop) | Infinity | 1.300 | | |

-continued

| si | ri | di | ni | vi |
|---|---|---|---|---|
| 13(ASP) | 24.504 | 2.800 | 1.74688 | 49.30 |
| 14 | 14.347 | 5.485 | 1.49845 | 81.50 |
| 15 | 188.879 | (d15) | | |
| 16(ASP) | 46.745 | 3.500 | 1.48914 | 70.30 |
| 17(ASP) | −51.179 | (d17) | | |
| 18 | 91.996 | 1.113 | 1.80831 | 46.50 |
| 19 | 14.264 | 3.433 | 1.49845 | 81.60 |
| 20 | 28.727 | 0.850 | | |
| 21 | 20.480 | 6.509 | 1.49845 | 81.60 |
| 22 | −23.194 | 3.411 | | |
| 23(ASP) | −46.430 | 1.680 | 1.77767 | 47.10 |
| 24(ASP) | 55.000 | (d24) | | |

Table 2 shows focal lengths f, F values Fno, half angle of views ω, and surface spacings in wide-angle ends, intermediate focal lengths, and telephoto ends according to the zoom lens of the first embodiment.

| | Wide-angle end | Intermediate focal length | Telephoto end |
|---|---|---|---|
| f | 16.48 | 24.07 | 33.95 |
| Fno | 4.07 | 4.08 | 4.09 |
| ω | 54.04 | 41.55 | 31.80 |
| d9 | 36.400 | 16.337 | 3.395 |
| d15 | 5.491 | 5.300 | 4.703 |
| d17 | 2.300 | 2.491 | 3.087 |
| d24 | 25.839 | 33.876 | 43.762 |

In the zoom lens according to the first embodiment, the following surfaces are formed to be aspheric: both surfaces (the first surface and the second surface) of the negative meniscus lens L11 of the first lens group GR1; an image side surface (the fifth surface) of the negative meniscus lens L12 of the first lens group GR1; an object side surface (the thirteenth surface) of the negative meniscus lens L22 of the second lens group GR2; both surfaces (the sixteenth surface and the seventeenth surface) of the biconvex lens L31 of the third lens group GR3; and both surfaces (the twenty-third surface and the twenty-fourth surface) of the biconcave lens L44 of the fourth lens group GR4.

Table 3 shows conic constants κ and the 4th-order, 6th-order, 8th-order, 10th-order, and 12th-order aspherical coefficients A4, A6, A8, A10 and A12 of the surfaces. In Table 3 and the following tables showing the aspherical coefficients, a reference symbol "E-i" represents an exponential expression having a base of 10, that is, "$10^{-i}$". For example, "0.12345E-05" represents "$0.12345 \times 10^{-5}$".

| si | κ | A4 | A6 | A8 | A10 | A12 |
|---|---|---|---|---|---|---|
| 1 | −1.0000 | 1.5215E−05 | −2.4220E−08 | 2.8219E−11 | −1.9560E−14 | 5.59000E−18 |
| 2 | −0.8006 | 5.8285E−06 | −4.9708E−11 | 2.3793E−08 | 1.1524E−13 | 0.00000E+00 |
| 5 | −0.7179 | 2.1334E−05 | 1.2458E−08 | −1.6800E−10 | 4.0809E−13 | −5.84010E−16 |
| 13 | 0.0000 | −8.6923E−06 | −2.5058E−08 | 1.1660E−10 | −5.7880E−13 | 0.00000E+00 |
| 16 | 0.0000 | 1.0633E−05 | −3.6480E−08 | 8.8691E−10 | −1.1156E−11 | 0.00000E+00 |
| 17 | 0.0000 | −1.0859E−06 | −7.5619E−08 | 8.8706E−10 | −1.1124E−11 | 0.00000E+00 |
| 23 | 0.0000 | 2.1652E−05 | −5.8231E−07 | 2.9815E−09 | −1.2507E−11 | 0.00000E+00 |
| 24 | 0.0000 | 6.1977E−05 | −4.6543E−07 | 2.6378E−09 | −7.1537E−12 | 0.00000E+00 |

Table 4 shows initial surfaces, focal lengths, entire lengths, front-side principal point positions, and rear-side principal point positions of the lens groups GR1 to GR4 according to the zoom lens of the first embodiment.

| | Initial surface | Focal length | Entire length | Front-side principal point position | Rear-side principal point position |
|---|---|---|---|---|---|
| GR1 | 1 | −30.834 | 27.677 | 2.12 | −30.407 |
| GR2 | 10 | 53.887 | 12.186 | −0.479 | −7.818 |
| GR3 | 16 | 50.539 | 3.5 | −1.135 | −1.243 |
| GR4 | 18 | −75.795 | 16.997 | −10.891 | −0.711 |

[Aberration of Zoom Lens]

Figure 2:
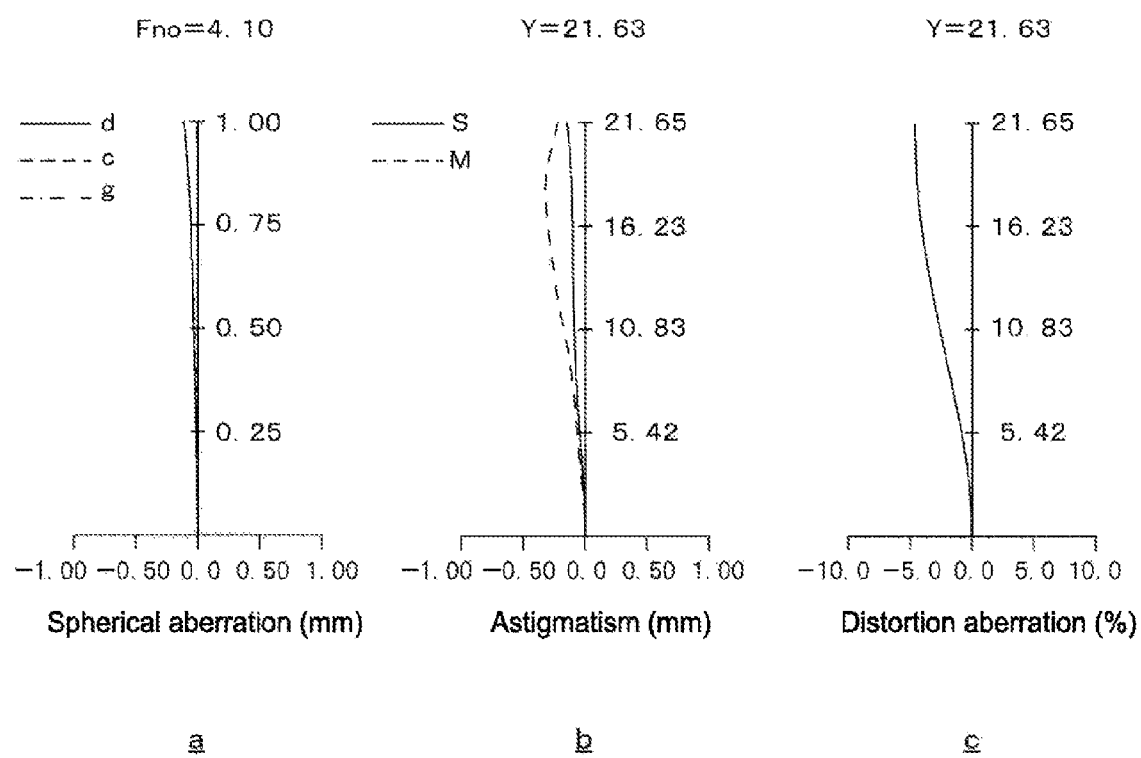
FIG. 2 is a diagram showing various aberrations in a wide-angle end of the zoom lens according to the first embodiment of the present technology.
Figure 3:
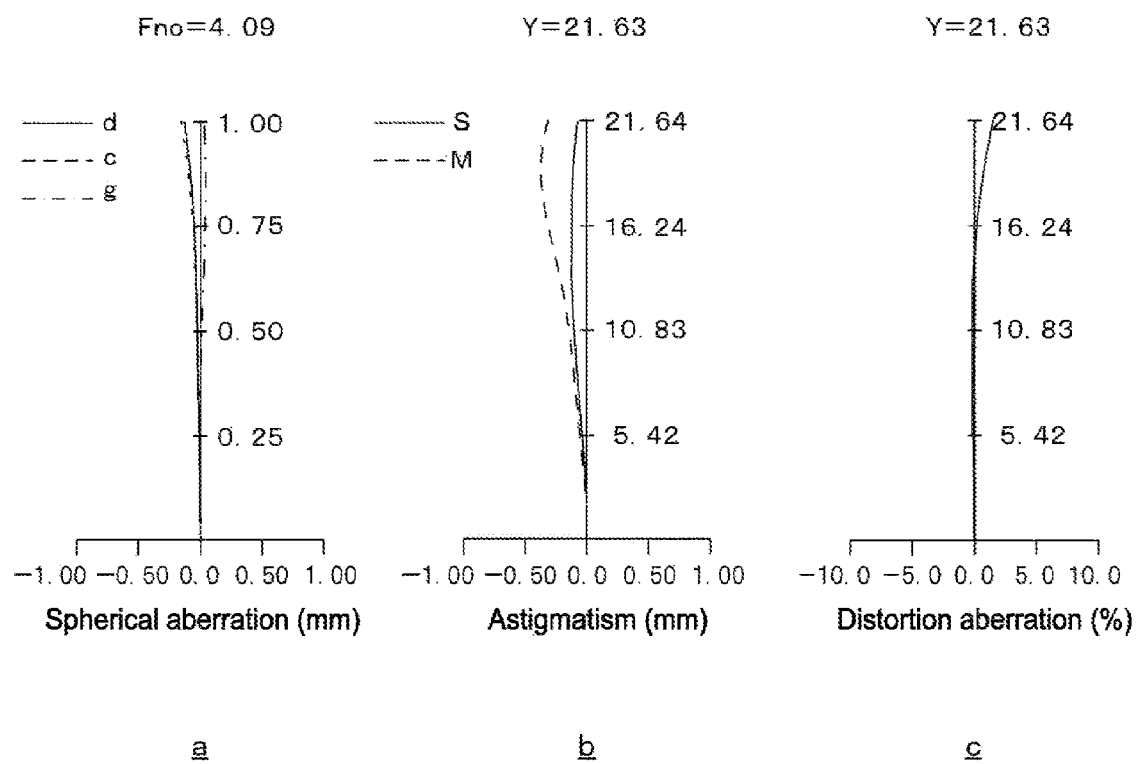
FIG. 3 is a diagram showing various aberrations in an intermediate focal length of the zoom lens according to the first embodiment of the present technology.
Figure 4:
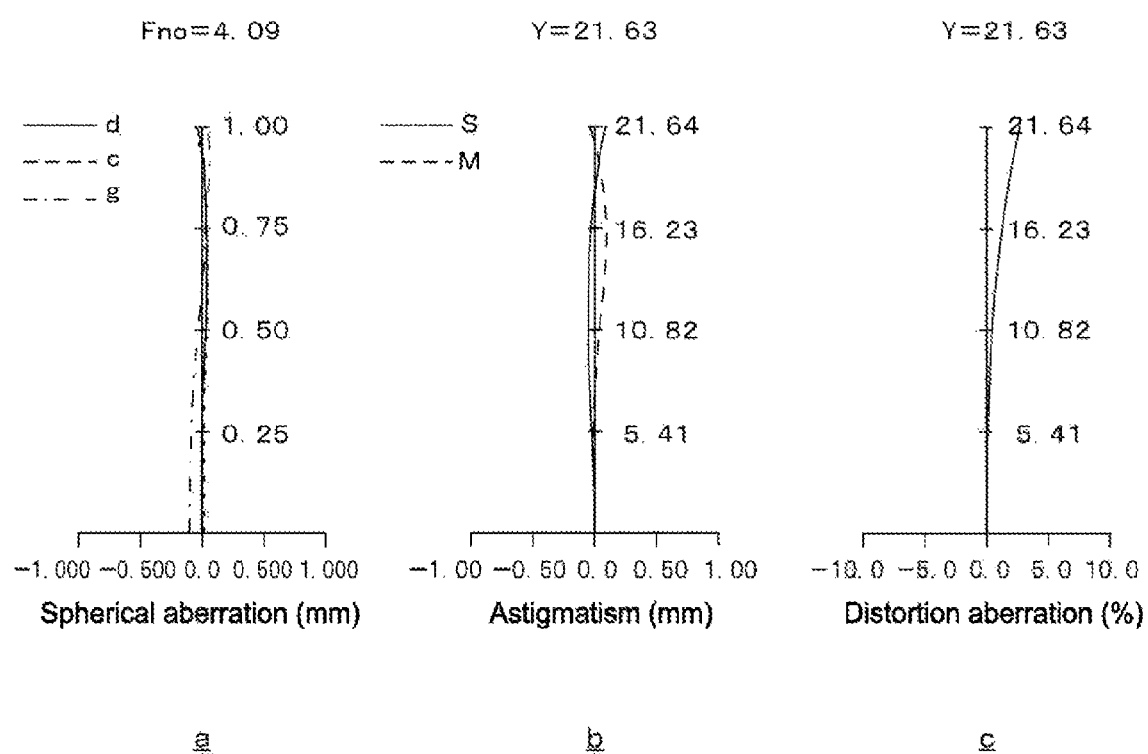
FIG. 4 is a diagram showing various aberrations in a telephoto end of the zoom lens according to the first embodiment of the present technology.

FIGS. 2 to 4 are diagrams showing various aberrations of the zoom lens according to the first embodiment of the present technology. FIG. 2 shows diagrams of various aberrations in a focus state in the wide-angle end. FIG. 3 shows diagrams of various aberrations in a focus state to the intermediate focal length between the wide-angle end and the telephoto end. FIG. 4 shows diagrams of various aberrations in a focus state in the telephoto end. In each of these diagrams, "a" represents a spherical aberration diagram, "b" represents an astigmatism diagram (image field curvature diagram), and "c" represents a distortion aberration diagram.

It should be noted that in each of the spherical aberration diagrams and the spherical aberration diagrams to be described later, a solid line represents a value at the d-line (the wavelength of 587.6 nm), a dashed line represents a value at a c-line (the wavelength of 656.3 nm), and a dot-dashed line represents a value at a g-line (the wavelength of 435.8 nm). Moreover, in each of the astigmatism diagrams and the astigmatism diagrams to be described later, the solid line represents a value on a sagittal image surface of the d line, and the dashed line shows a value on a meridional image surface of the d line.

Moreover, in each of the distortion aberration diagrams and the distortion aberration diagrams to be described later, the solid line represents a value of the d line. Moreover, in each of the spherical aberration diagrams and the spherical aberration diagrams to be described later, "Fno" of a vertical axis represents an open F value (F-number) and "NA" represents a numerical aperture. Moreover, in each of the astigmatism diagrams and the distortion aberration diagrams as well as the astigmatism diagrams and the distortion aberration diagrams which are described later, "Y" of the vertical axis represents an image height, in units of millimeters.

As is apparent from the aberration diagrams, the numerical example 1 achieves suitably correction of the various aberrations and has excellent imaging performance.

2. Second Embodiment

[Lens Configuration]

Figure 5:
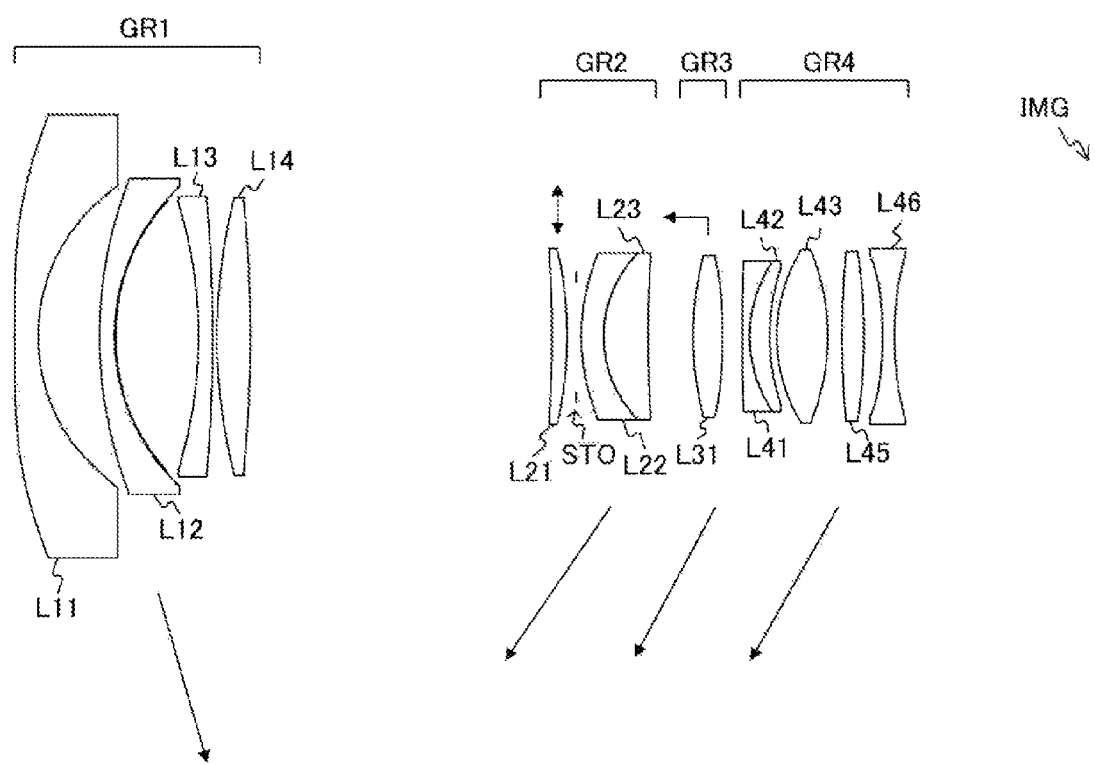
FIG. 5 is a diagram showing a lens configuration of a zoom lens according to a second embodiment of the present technology.

FIG. 5 is a diagram showing a lens configuration of a zoom lens according to a second embodiment of the present technology.

The zoom lens according to the second embodiment includes a first lens group GR1, a second lens group GR2, a third lens group GR3, and a fourth lens group GR4, arranged in order from an object side to an image surface IMG. The first lens group GR1 has a negative refractive power. The second lens group GR2 has a positive refractive power. The third lens group GR3 has a positive refractive power. The fourth lens group GR4 has a negative refractive power.

The first lens group GR1 includes a negative meniscus lens L11, a negative meniscus lens L12, a negative meniscus lens L13, and a biconvex lens L14, arranged in order from the object side. The negative meniscus lens L11 is a lens using aspherical surfaces for both surfaces with a convex surface facing to the object side. The negative meniscus lens L12 is a lens with a convex surface facing to the object side. This negative meniscus lens L12 is formed by attaching aspherical resin to a spherical surface of an image surface side. The negative meniscus lens L13 is a lens with a concave surface facing to the object side. The biconvex lens L14 is a lens having convex surfaces on both surfaces.

The second lens group GR2 includes a positive meniscus lens L21, a negative meniscus lens L22, and a positive meniscus lens L23, arranged in order from the object side. The positive meniscus lens L21 is a lens with a convex surface facing to the image side. The negative meniscus lens L22 is a lens using an aspherical surface for a surface of the object side with a convex surface facing to the object side. The positive meniscus lens L23 is a lens with a convex surface facing to the object side. The negative meniscus lens L22 and the positive meniscus lens L23 are bonded to each other to form a cemented lens.

The third lens group GR3 is constituted of a biconvex lens L31 having convex surfaces on both surfaces using aspherical surfaces at both sides.

The fourth lens group GR4 includes a negative meniscus lens L41, a positive meniscus lens L42, a biconvex lens L43, a biconvex lens L45, and a biconcave lens 46, arranged in order from the object side. The negative meniscus lens L41 is a lens with a convex surface facing to the object side. The positive meniscus lens L42 is a lens with a convex surface facing to the object side. The negative meniscus lens L41 and the positive meniscus lens L42 are bonded to each other to form a cemented lens. The biconvex lens L43 is a lens having convex surfaces on both surfaces. The biconvex lens L45 is a lens having convex surfaces on both surfaces. The biconcave lens 46 is a lens having concave surfaces on both surfaces using aspherical surfaces on surfaces at both sides.

In the zoom lens according to the second embodiment, all lens groups are moved in an optical axis direction upon zooming from a wide-angle end state to a telephoto end state.

Moreover, focusing from infinity to a near side is performed by moving the third lens group GR3 in the optical axis direction.

Upon occurrence of a hand-shake vibration, the positive meniscus lens L21 arranged closest to the object side of the second lens group GR2 as a vibration-proof lens is moved in a direction perpendicular to the optical axis, thereby correcting image blurring.

It should be noted that a stop STO is arranged between the positive meniscus lens L21 and the negative meniscus lens L22 in the second lens group GR2.

Specification of Zoom Lens

Table 5 shows lens data of a numerical example 2 in which specific numerical values are applied to the zoom lens according to the second embodiment.

| si | ri | di | ni | vi |
|---|---|---|---|---|
| 1(ASP) | 1500.000 | 2.800 | 1.77173 | 49.20 |
| 2(ASP) | 23.051 | 7.296 | | |
| 3 | 53.179 | 1.800 | 1.83945 | 42.70 |
| 4 | 25.233 | 0.150 | 1.53699 | 41.70 |
| 5(ASP) | 27.823 | 9.839 | | |
| 6 | −55.866 | 1.700 | 1.80831 | 46.50 |
| 7 | −195.709 | 0.500 | | |
| 8 | 70.182 | 3.977 | 2.00912 | 29.10 |
| 9 | −168.913 | (d9) | | |
| 10 | −134.850 | 1.764 | 1.57124 | 56.00 |
| 11 | −49.618 | 0.900 | | |
| 12(Stop) | Infinity | 0.800 | | |
| 13(ASP) | 25.397 | 2.659 | 1.74688 | 49.30 |
| 14 | 14.660 | 5.274 | 1.49845 | 81.50 |
| 15 | 157.123 | (d15) | | |
| 16(ASP) | 42.875 | 3.500 | 1.48914 | 70.30 |
| 17(ASP) | −55.819 | (d17) | | |
| 18 | 219.200 | 0.900 | 1.80831 | 46.50 |
| 19 | 16.702 | 2.376 | 1.49845 | 81.60 |
| 20 | 26.643 | 0.850 | | |
| 21 | 20.442 | 6.088 | 1.49845 | 81.60 |
| 22 | −27.471 | 1.694 | | |
| 23 | 119.522 | 2.600 | 1.43809 | 95.00 |

-continued

| si | ri | di | ni | vi |
|---|---|---|---|---|
| 24 | −68.702 | 2.193 | | |
| 25(ASP) | −46.491 | 1.400 | 1.77767 | 47.10 |
| 26(ASP) | 41.490 | (d26) | | |

Table 6 shows focal lengths f, F values Fno, half angle of views ω, and surface spacings in wide-angle ends, intermediate focal lengths, and telephoto ends according to the zoom lens of the second embodiment.

| | Wide-angle end | Intermediate focal length | Telephoto end |
|---|---|---|---|
| f | 16.48 | 24.00 | 33.95 |
| Fno | 4.10 | 4.09 | 4.09 |
| ω | 54.19 | 41.71 | 31.84 |
| d9 | 35.925 | 16.297 | 3.307 |
| d15 | 5.404 | 5.416 | 4.865 |
| d17 | 2.312 | 2.300 | 2.851 |
| d26 | 24.289 | 32.190 | 41.848 |

In the zoom lens according to the second embodiment, the following surfaces are formed to be aspheric: both surfaces (the first surface and the second surface) of the negative meniscus lens L11 of the first lens group GR1; an image side surface (the fifth surface) of the negative meniscus lens L12 of the first lens group GR1; an object side surface (the thirteenth surface) of the negative meniscus lens L22 of the second lens group GR2; both surfaces (the sixteenth surface and the seventeenth surface) of the biconvex lens L31 of the third lens group GR3; and both surfaces (the twenty-fifth surface and the twenty-sixth surface) of the biconcave lens L46 of the fourth lens group GR4.

Table 7 shows conic constants κ and the 4th-order, 6th-order, 8th-order, 10th-order, and 12th-order aspherical coefficients A4, A6, A8, A10 and A12 of the surfaces.

| si | κ | A4 | A6 | A8 | A10 | A12 |
|---|---|---|---|---|---|---|
| 1 | −1.0000 | 1.7847E−05 | −2.7556E−08 | 2.7793E−11 | −1.6945E−14 | 4.51000E−18 |
| 2 | −0.6398 | 1.0302E−05 | 3.0287E−08 | −5.1404E−11 | 2.4512E−14 | 0.00000E+00 |
| 5 | −0.8831 | 1.9716E−05 | −7.7329E−09 | −4.4147E−11 | 2.7278E−13 | −4.13080E−16 |
| 13 | 0.0000 | −9.0247E−06 | −2.5995E−08 | 1.5090E−10 | −7.7954E−13 | 0.00000E+00 |
| 16 | 0.0000 | 1.5069E−05 | −9.1790E−08 | 1.4508E−09 | −1.7008E−11 | 0.00000E+00 |
| 17 | 0.0000 | 2.9780E−06 | −1.4257E−07 | 1.4130E−09 | −1.6252E−11 | 0.00000E+00 |
| 25 | 0.0000 | −2.0173E−05 | −3.2261E−07 | 1.2161E−09 | −9.1450E−12 | 0.00000E+00 |
| 26 | 0.0000 | 1.8839E−05 | −2.0129E−07 | 1.1731E−09 | −3.3367E−12 | 0.00000E+00 |

Table 8 shows initial surfaces, focal lengths, entire lengths, front-side principal point positions, and rear-side principal point positions of the lens groups GR1 to GR4 according to the zoom lens of the second embodiment.

| | Initial surface | Focal length | Entire length | Front-side principal point position | Rear-side principal point position |
|---|---|---|---|---|---|
| GR1 | 1 | −31.424 | 28.064 | 1.907 | −30.427 |
| GR2 | 10 | 55.873 | 11.398 | −0.019 | −7.595 |
| GR3 | 16 | 50.159 | 3.5 | −1.033 | −1.345 |
| GR4 | 18 | −76.008 | 18.103 | −13.583 | 1.107 |

Aberration of Zoom Lens

Figure 6:
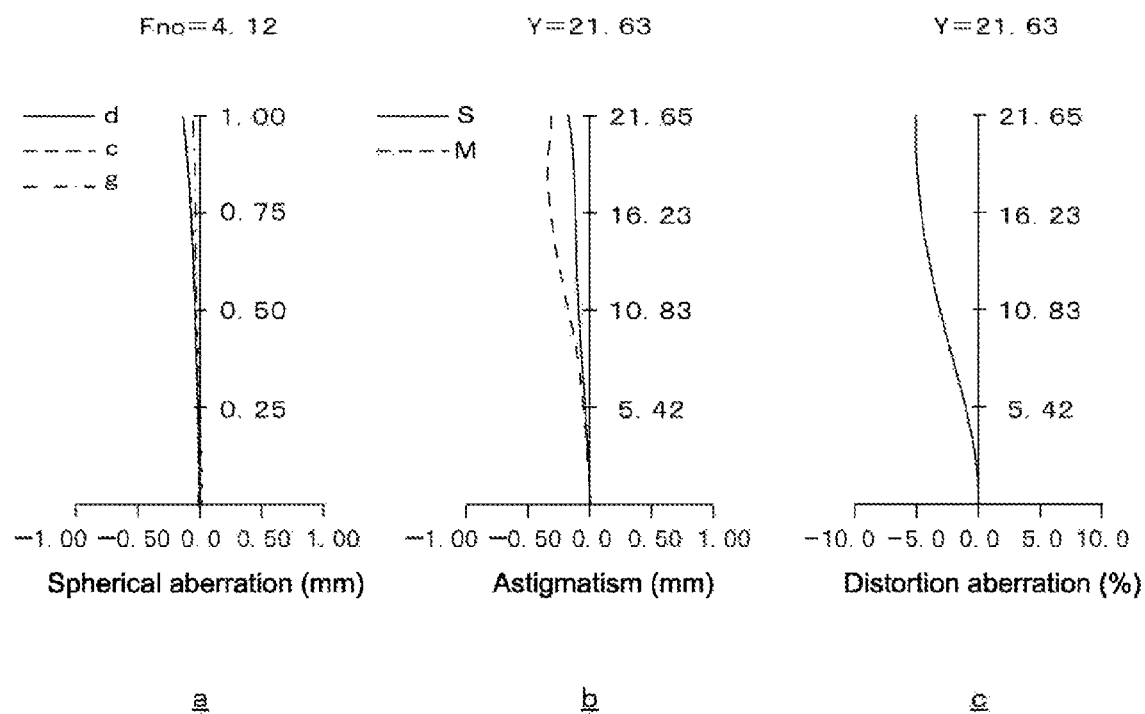
FIG. 6 is a diagram showing various aberrations in a wide-angle end of the zoom lens according to the second embodiment of the present technology.
Figure 7:
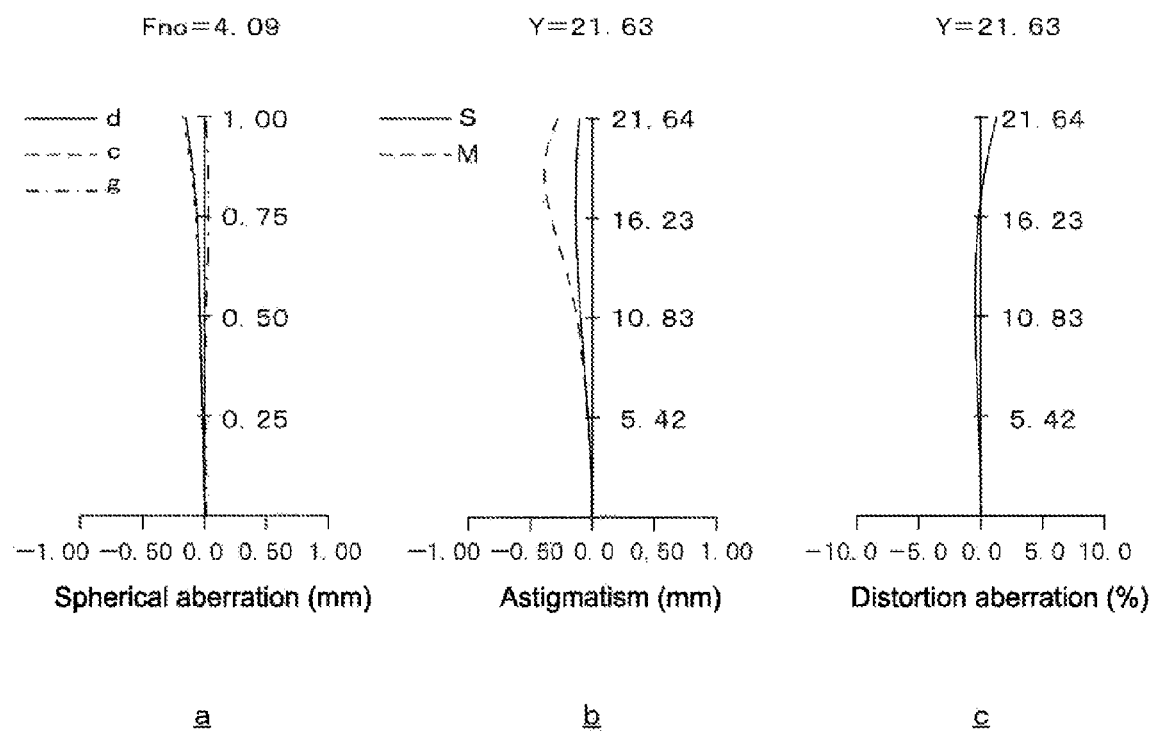
FIG. 7 is a diagram showing various aberrations in an intermediate focal length of the zoom lens according to the second embodiment of the present technology.
Figure 8:
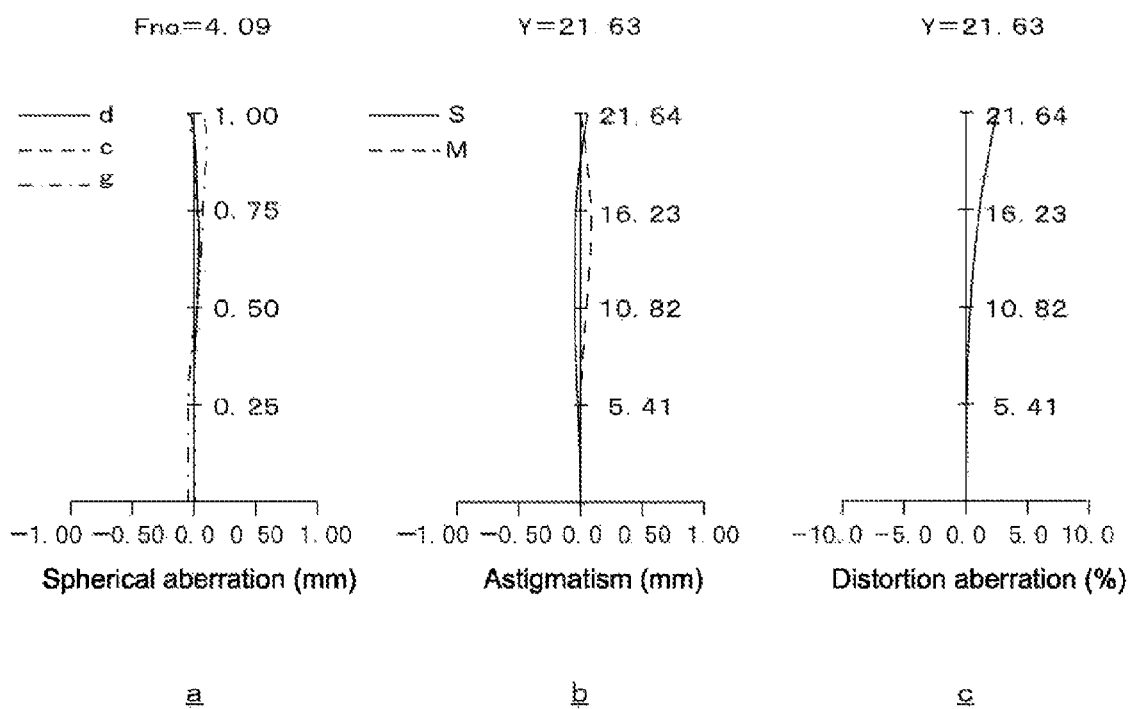
FIG. 8 is a diagram showing various aberrations in a telephoto end of the zoom lens according to the second embodiment of the present technology.

FIGS. 6 to 8 are diagrams showing various aberrations of the zoom lens according to the second embodiment of the present technology. FIG. 6 shows diagrams of various aberrations in a focus state in the wide-angle end. FIG. 7 shows diagrams of various aberrations in a focus state to the intermediate focal length between the wide-angle end and the telephoto end. FIG. 8 shows diagrams of various aberrations in a focus state in the telephoto end. In each of these diagrams, "a" represents a spherical aberration diagram, "b" represents an astigmatism diagram (image field curvature diagram), and "c" represents a distortion aberration diagram.

As is apparent from the aberration diagrams, the numerical example 2 achieves suitably correction of the various aberrations and has excellent imaging performance.

3. Third Embodiment

[Lens Configuration]

Figure 9:
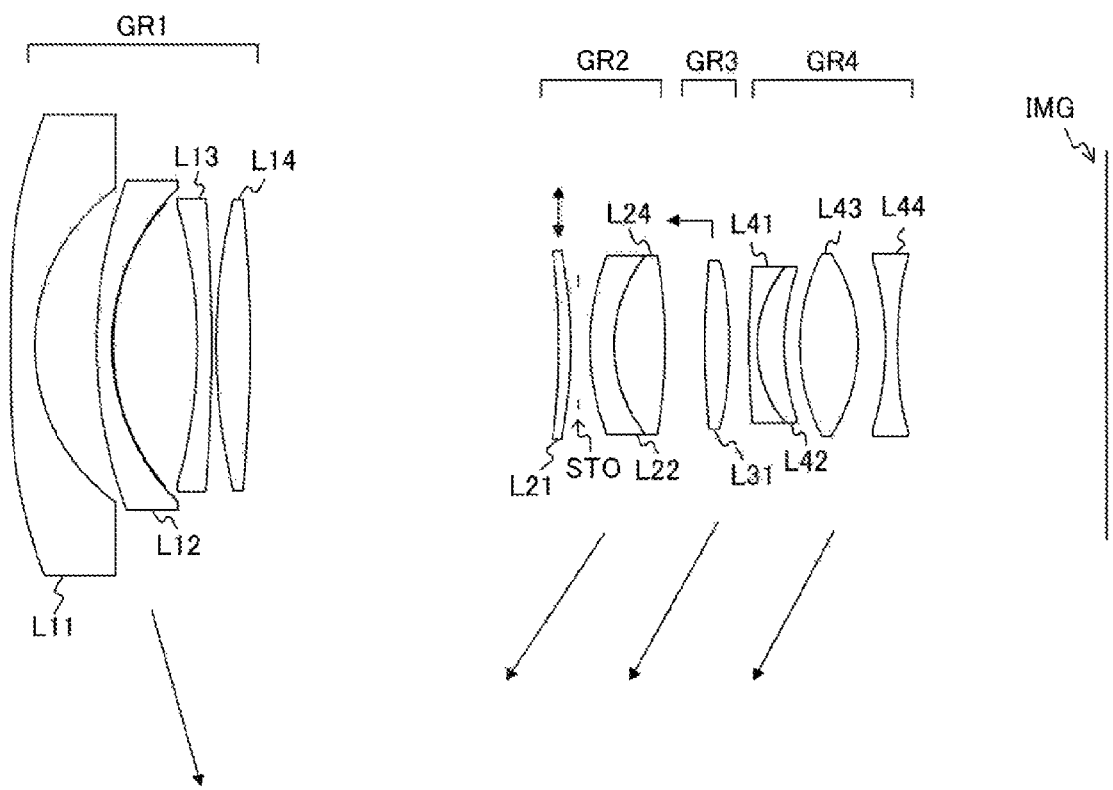
FIG. 9 is a diagram showing a lens configuration of a zoom lens according to a third embodiment of the present technology.

FIG. 9 is a diagram showing a lens configuration of a zoom lens according to a third embodiment of the present technology.

The zoom lens according to the third embodiment includes a first lens group GR1, a second lens group GR2, a third lens group GR3, and a fourth lens group GR4, arranged in order from an object side to an image surface IMG. The first lens group GR1 has a negative refractive power. The second lens group GR2 has a positive refractive power. The third lens group GR3 has a positive refractive power. The fourth lens group GR4 has a negative refractive power.

The first lens group GR1 includes a negative meniscus lens L11, a negative meniscus lens L12, a negative meniscus lens L13, and a biconvex lens L14, arranged in order from the object side. The negative meniscus lens L11 is a lens using aspherical surfaces for both surfaces with a convex surface facing to the object side. The negative meniscus lens L12 is a lens with a convex surface facing to the object side. This negative meniscus lens L12 is formed by attaching aspherical resin to a spherical surface of an image surface side. The negative meniscus lens L13 is a lens with a concave surface facing to the object side. The biconvex lens L14 is a lens having convex surfaces on both surfaces.

The second lens group GR2 includes a positive meniscus lens L21, a negative meniscus lens L22, and a biconvex lens L24, arranged in order from the object side. The positive meniscus lens L21 is a lens with a convex surface facing to the image side. The negative meniscus lens L22 is a lens using an aspherical surface for a surface of the object side with a convex surface facing to the object side. The biconvex lens L24 is a lens having convex surfaces on both surfaces. The negative meniscus lens L22 and the biconvex lens L24 are bonded to each other to form a cemented lens.

The third lens group GR3 is constituted of a biconvex lens L31 having convex surfaces on both surfaces using aspherical surfaces at both sides.

The fourth lens group GR4 includes a negative meniscus lens L41, a positive meniscus lens L42, a biconvex lens L43, and a biconcave lens L44, arranged in order from the object side. The negative meniscus lens L41 is a lens with a convex surface facing to the object side. The positive meniscus lens L42 is a lens with a convex surface facing to the object side. The negative meniscus lens L41 and the positive meniscus lens L42 are bonded to each other to form a cemented lens. The biconvex lens L43 is a lens having convex surfaces on both surfaces. The biconcave lens L44 is a lens having concave surfaces on both surfaces using aspherical surfaces on surfaces at both sides.

In the zoom lens according to the third embodiment, all lens groups are moved in an optical axis direction upon zooming from a wide-angle end state to a telephoto end state.

Moreover, focusing from infinity to a near side is performed by moving the third lens group GR3 in the optical axis direction.

Upon occurrence of a hand-shake vibration, the positive meniscus lens L21 arranged closest to the object side of the second lens group GR2 as a vibration-proof lens is moved in a direction perpendicular to the optical axis, thereby correcting image blurring.

It should be noted that a stop STO is arranged between the positive meniscus lens L21 and the negative meniscus lens L22 in the second lens group GR2.

[Specification of Zoom Lens]

Table 9 shows lens data of a numerical example 3 in which specific numerical values are applied to the zoom lens according to the third embodiment.

| si | ri | di | ni | vi |
|---|---|---|---|---|
| 1(ASP) | 1500.000 | 2.800 | 1.77173 | 49.20 |
| 2(ASP) | 22.671 | 7.220 | | |
| 3 | 53.435 | 1.800 | 1.83945 | 42.70 |
| 4 | 25.233 | 0.150 | 1.53699 | 41.70 |
| 5(ASP) | 27.896 | 9.786 | | |
| 6 | −56.848 | 1.700 | 1.80831 | 46.50 |
| 7 | −196.301 | 0.500 | | |
| 8 | 69.860 | 3.963 | 2.00912 | 29.10 |
| 9 | −173.890 | (d9) | | |
| 10 | −86.430 | 1.401 | 1.57124 | 56.00 |

-continued

| si | ri | di | ni | vi |
|---|---|---|---|---|
| 11 | −53.740 | 0.934 | | |
| 12(Stop) | Infinity | 1.300 | | |
| 13(ASP) | 26.196 | 2.800 | 1.74688 | 49.30 |
| 14 | 16.260 | 6.000 | 1.49845 | 81.50 |
| 15 | −58.708 | (d15) | | |
| 16(ASP) | 77.400 | 2.893 | 1.48914 | 70.30 |
| 17(ASP) | −47.907 | (d17) | | |
| 18 | 113.986 | 0.900 | 1.80831 | 46.50 |
| 19 | 14.047 | 3.123 | 1.49845 | 81.60 |
| 20 | 25.322 | 1.844 | | |
| 21 | 22.965 | 6.806 | 1.49845 | 81.60 |
| 22 | −18.998 | 3.165 | | |
| 23(ASP) | −36.848 | 1.435 | 1.77767 | 47.10 |
| 24(ASP) | 55.000 | (d24) | | |

Table 10 shows focal lengths f, F values Fno, half angle of views ω, and surface spacings in wide-angle ends, intermediate focal lengths, and telephoto ends according to the zoom lens of the third embodiment.

| | Wide-angle end | Intermediate focal length | Telephoto end |
|---|---|---|---|
| f | 16.48 | 24.00 | 33.95 |
| Fno | 4.04 | 4.06 | 4.08 |
| ω | 54.06 | 41.59 | 31.79 |
| d9 | 36.036 | 16.558 | 3.582 |
| d15 | 4.637 | 4.595 | 4.138 |
| d17 | 2.300 | 2.342 | 2.799 |
| d24 | 24.419 | 32.336 | 42.209 |

In the zoom lens according to the third embodiment, the following surfaces are formed to be aspheric: both surfaces (the first surface and the second surface) of the negative meniscus lens L11 of the first lens group GR1; an image side surface (the fifth surface) of the negative meniscus lens L12 of the first lens group GR1; an object side surface (the thirteenth surface) of the negative meniscus lens L22 of the second lens group GR2; both surfaces (the sixteenth surface and the seventeenth surface) of the biconvex lens L31 of the third lens group GR3; and both surfaces (the twenty-third surface and the twenty-fourth surface) of the biconcave lens L44 of the fourth lens group GR4. Table 11 shows conic constants κ and the 4th-order, 6th-order, 8th-order, 10th-order, and 12th-order aspherical coefficients A4, A6, A8, A10 and A12 of the surfaces.

| si | κ | A4 | A6 | A8 | A10 | A12 |
|---|---|---|---|---|---|---|
| 1 | −1.0000 | 1.7700E−05 | −2.6479E−08 | 2.4386E−11 | −1.2881E−14 | 2.74000E−18 |
| 2 | −0.8324 | 1.1550E−05 | 3.4842E−08 | −5.4217E−11 | 1.3366E−14 | 0.00000E+00 |
| 5 | −0.7102 | 1.9321E−05 | −8.5467E−09 | −5.8959E−11 | 3.3438E−13 | −4.72840E−16 |
| 13 | 0.0000 | −1.2112E−05 | −2.6747E−08 | 1.1812E−10 | −6.3396E−13 | 0.00000E+00 |
| 16 | 0.0000 | −1.1540E−05 | −3.0701E−08 | 4.8632E−10 | −6.7914E−12 | 0.00000E+00 |
| 17 | 0.0000 | −2.0639E−05 | −2.5121E−08 | 5.6597E−10 | −7.3317E−12 | 0.00000E+00 |
| 23 | 0.0000 | −9.4433E−06 | −1.3457E−07 | 7.6058E−10 | −7.6156E−12 | 0.00000E+00 |
| 24 | 0.0000 | 3.0937E−05 | −3.9525E−08 | 2.2625E−10 | −1.7479E−12 | 0.00000E+00 |

Table 12 shows initial surfaces, focal lengths, entire lengths, front-side principal point positions, and rear-side principal point positions of the lens groups GR1 to GR4 according to the zoom lens of the third embodiment.

|  | Initial surface | Focal length | Entire length | Front-side principal point position | Rear-side principal point position |
|---|---|---|---|---|---|
| GR1 | 1 | −31.07 | 27.921 | 1.904 | −30.267 |
| GR2 | 10 | 39.252 | 12.436 | −3.931 | −5.012 |
| GR3 | 16 | 60.958 | 2.894 | −1.21 | −0.749 |
| GR4 | 18 | −50.799 | 17.276 | −6.912 | −4.502 |

[Aberration of Zoom Lens]

Figure 10:
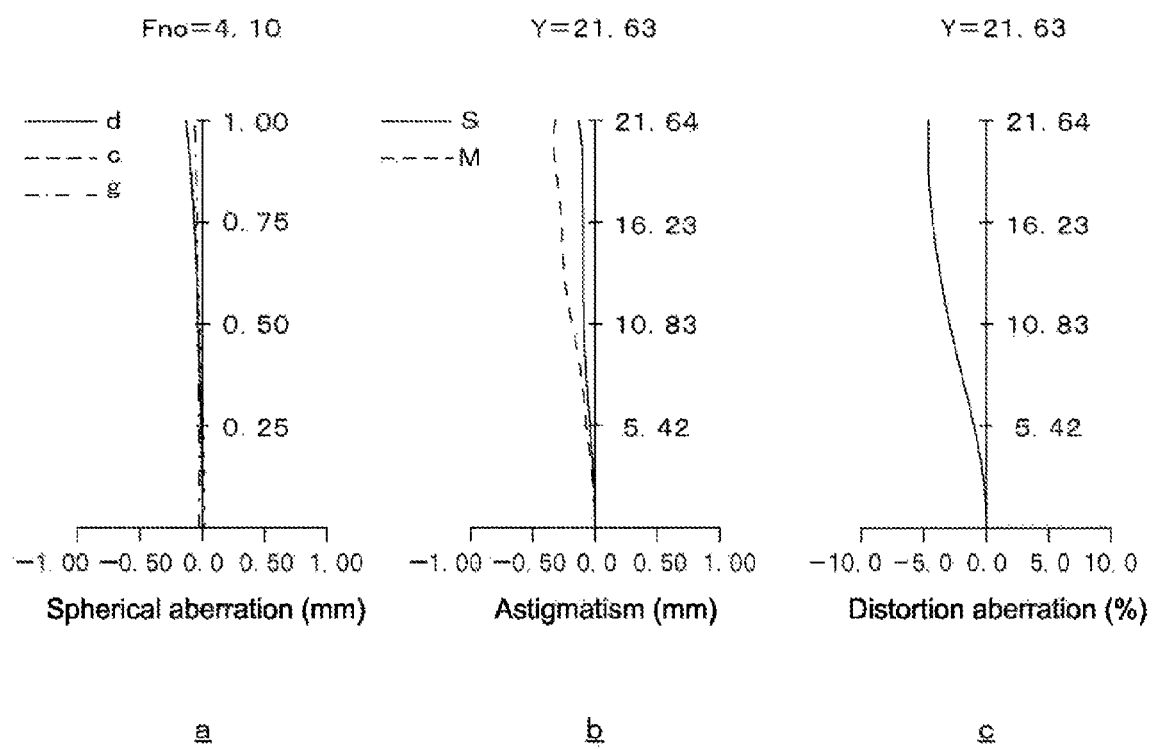
FIG. 10 is a diagram showing various aberrations in a wide-angle end of the zoom lens according to the third embodiment of the present technology.
Figure 11:
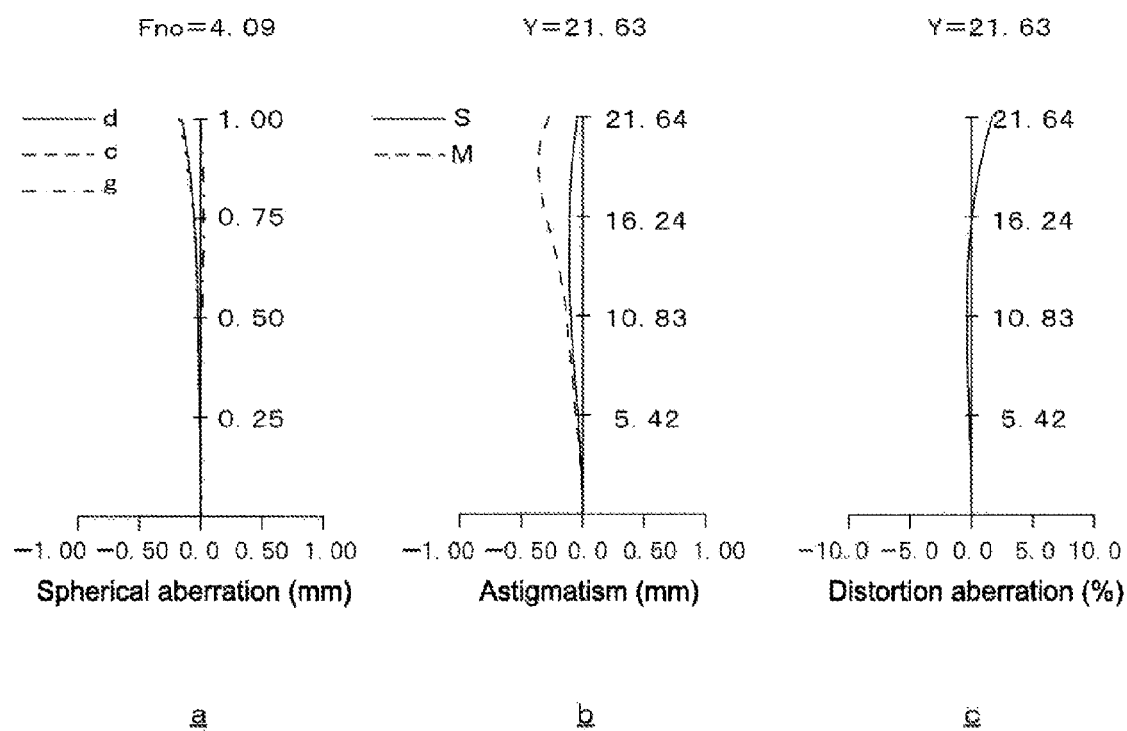
FIG. 11 is a diagram showing various aberrations in an intermediate focal length of the zoom lens according to the third embodiment of the present technology.
Figure 12:
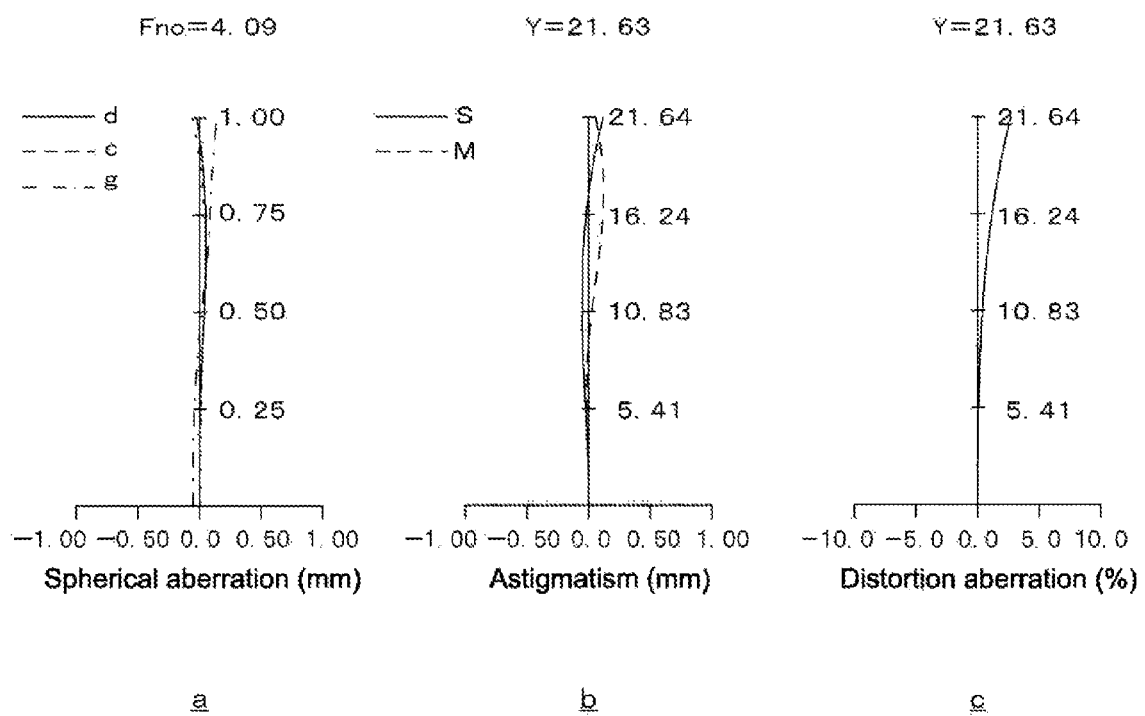
FIG. 12 is a diagram showing various aberrations in a telephoto end of the zoom lens according to the third embodiment of the present technology.

FIGS. 10 to 12 are diagrams showing various aberrations of the zoom lens according to the third embodiment of the present technology. FIG. 10 shows diagrams of various aberrations in a focus state in the wide-angle end. FIG. 11 shows diagrams of various aberrations in a focus state to the intermediate focal length between the wide-angle end and the telephoto end. FIG. 12 shows diagrams of various aberrations in a focus state in the telephoto end. In each of these diagrams, "a" represents a spherical aberration diagram, "b" represents an astigmatism diagram (image field curvature diagram), and "c" represents a distortion aberration diagram.

As is apparent from the aberration diagrams, the numerical example 3 achieves suitably correction of the various aberrations and has excellent imaging performance.

3. Fourth Embodiment

[Lens Configuration]

Figure 13:
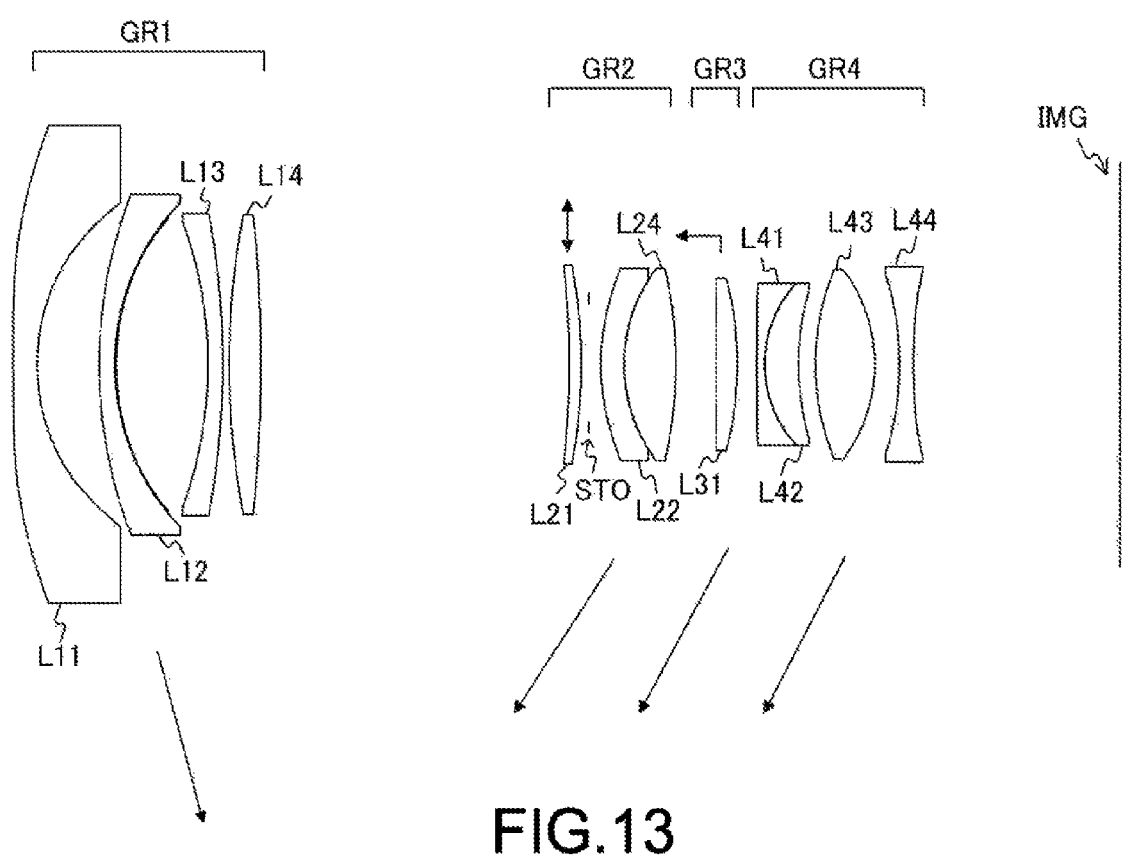
FIG. 13 is a diagram showing a lens configuration of a zoom lens according to a fourth embodiment of the present technology.

FIG. 13 is a diagram showing a lens configuration of a zoom lens according to a fourth embodiment of the present technology.

The zoom lens according to the fourth embodiment includes a first lens group GR1, a second lens group GR2, a third lens group GR3, and a fourth lens group GR4, arranged in order from an object side to an image surface IMG. The first lens group GR1 has a negative refractive power. The second lens group GR2 has a positive refractive power. The third lens group GR3 has a positive refractive power. The fourth lens group GR4 has a negative refractive power.

The first lens group GR1 includes a negative meniscus lens L11, a negative meniscus lens L12, a negative meniscus lens L13, and a biconvex lens L14, arranged in order from the object side. The negative meniscus lens L11 is a lens using aspherical surfaces for both surfaces with a convex surface facing to the object side. The negative meniscus lens L12 is a lens with a convex surface facing to the object side. This negative meniscus lens L12 is formed by attaching aspherical resin to a spherical surface of an image surface side. The negative meniscus lens L13 is a lens with a concave surface facing to the object side. The biconvex lens L14 is a lens having convex surfaces on both surfaces.

The second lens group GR2 includes a positive meniscus lens L21, a negative meniscus lens L22, and a biconvex lens L24, arranged in order from the object side. The positive meniscus lens L21 is a lens with a convex surface facing to the image side. The negative meniscus lens L22 is a lens using an aspherical surface for a surface of the object side with a convex surface facing to the object side. The biconvex lens L24 is a lens having convex surfaces on both surfaces.

The negative meniscus lens L22 and the biconvex lens L24 are bonded to each other to form a cemented lens.

The third lens group GR3 is constituted of a biconvex lens L31 having convex surfaces on both surfaces using aspherical surfaces at both sides.

The fourth lens group GR4 includes a negative meniscus lens L41, a positive meniscus lens L42, a biconvex lens L43, and a biconcave lens L44, arranged in order from the object side. The negative meniscus lens L41 is a lens with a convex surface facing to the object side. The positive meniscus lens L42 is a lens with a convex surface facing to the object side. The negative meniscus lens L41 and the positive meniscus lens L42 are bonded to each other to form a cemented lens. The biconvex lens L43 is a lens having convex surfaces on both surfaces. The biconcave lens L44 is a lens having concave surfaces on both surfaces using aspherical surfaces on surfaces at both sides.

In the zoom lens according to the fourth embodiment, all lens groups are moved in an optical axis direction upon zooming from a wide-angle end state to a telephoto end state.

Moreover, focusing from infinity to a near side is performed by moving the third lens group GR3 in the optical axis direction.

Upon occurrence of a hand-shake vibration, the positive meniscus lens L21 arranged closest to the object side of the second lens group GR2 as a vibration-proof lens is moved in a direction perpendicular to the optical axis, thereby correcting image blurring.

It should be noted that a stop STO is arranged between the positive meniscus lens L21 and the negative meniscus lens L22 in the second lens group GR2.

[Specification of Zoom Lens]

Table 13 shows lens data of a numerical example 4 in which specific numerical values are applied to the zoom lens according to the fourth embodiment.

| si | ri | di | ni | vi |
|---|---|---|---|---|
| 1(ASP) | 1500.000 | 2.800 | 1.77173 | 49.20 |
| 2(ASP) | 22.588 | 7.199 |  |  |
| 3 | 50.601 | 1.800 | 1.83945 | 42.70 |
| 4 | 25.233 | 0.150 | 1.53699 | 41.70 |
| 5(ASP) | 27.185 | 10.640 |  |  |
| 6 | −44.437 | 1.700 | 1.80831 | 46.50 |
| 7 | −89.064 | 0.763 |  |  |
| 8 | 85.163 | 3.665 | 2.00912 | 29.10 |
| 9 | −158.649 | (d9) |  |  |
| 10 | −90.120 | 1.388 | 1.57124 | 56.00 |
| 11 | −55.727 | 0.900 |  |  |
| 12(Stop) | Infinity | 1.371 |  |  |
| 13(ASP) | 24.392 | 2.679 | 1.74688 | 49.30 |
| 14 | 17.205 | 6.000 | 1.49845 | 81.50 |
| 15 | −45.779 | (d15) |  |  |
| 16(ASP) | 190.436 | 2.486 | 1.48914 | 70.30 |
| 17(ASP) | −44.100 | (d17) |  |  |
| 18 | 365.493 | 0.900 | 1.80831 | 46.50 |
| 19 | 12.943 | 3.929 | 1.49845 | 81.60 |
| 20 | 28.735 | 1.945 |  |  |
| 21 | 26.493 | 6.888 | 1.49845 | 81.60 |
| 22 | −17.042 | 2.832 |  |  |
| 23(ASP) | −36.926 | 1.642 | 1.77767 | 47.10 |
| 24(ASP) | 62.046 | (d24) |  |  |

Table 14 shows focal lengths f, F values Fno, half angle of views ω, and surface spacings in wide-angle ends, intermediate focal lengths, and telephoto ends according to the zoom lens of the fourth embodiment.

|  | Wide-angle end | Intermediate focal length | Telephoto end |
|---|---|---|---|
| f | 16.48 | 24.00 | 33.95 |
| Fno | 4.11 | 4.09 | 4.09 |
| ω | 54.00 | 41.54 | 31.78 |
| d9 | 36.061 | 16.605 | 3.527 |
| d15 | 4.623 | 4.623 | 4.132 |
| d17 | 2.300 | 2.300 | 2.791 |
| d24 | 24.119 | 32.348 | 42.572 |

In the zoom lens according to the fourth embodiment, the following surfaces are formed to be aspheric: both surfaces (the first surface and the second surface) of the negative meniscus lens L11 of the first lens group GR1; an image side surface (the fifth surface) of the negative meniscus lens L12 of the first lens group GR1; an object side surface (the thirteenth surface) of the negative meniscus lens L22 of the second lens group GR2; both surfaces (the sixteenth surface and the seventeenth surface) of the biconvex lens L31 of the third lens group GR3; and both surfaces (the twenty-third surface and the twenty-fourth surface) of the biconcave lens L44 of the fourth lens group GR4.

Table 15 shows conic constants κ and the 4th-order, 6th-order, 8th-order, 10th-order, and 12th-order aspherical coefficients A4, A6, A8, A10 and A12 of the surfaces.

| si | κ | A4 | A6 | A8 | A10 | A12 |
|---|---|---|---|---|---|---|
| 1 | 1.0000 | 1.9907E−05 | −3.0641E−08 | 2.6112E−11 | −1.0865E−14 | 1.04000E−18 |
| 2 | −0.4941 | 1.2154E−05 | 4.0288E−08 | −6.4534E−11 | −6.2405E−14 | 0.00000E+00 |
| 5 | −0.9493 | 1.6838E−05 | −1.6203E−08 | −3.7605E−12 | 2.9705E−13 | −2.30840E−16 |
| 13 | 0.0000 | −1.2148E−05 | −2.5966E−08 | 9.5143E−12 | −1.8120E−13 | 0.00000E+00 |
| 16 | 0.0000 | −3.8995E−05 | 4.6688E−08 | 6.5982E−10 | 6.4493E−13 | 0.00000E+00 |
| 17 | 0.0000 | −4.0206E−05 | 1.1291E−07 | 4.0421E−10 | −8.7453E−14 | 0.00000E+00 |
| 23 | 0.0000 | −3.7142E−05 | 3.0940E−07 | −1.7715E−09 | 1.6105E−12 | 0.00000E+00 |
| 24 | 0.0000 | 7.9921E−08 | 3.6337E−07 | −2.1972E−09 | 5.0729E−12 | 0.00000E+00 |

Table 16 shows initial surfaces, focal lengths, entire lengths, front-side principal point positions, and rear-side principal point positions of the lens groups GR1 to GR4 according to the zoom lens of the fourth embodiment.

|  | Initial surface | Focal length | Entire length | Front-side principal point position | Rear-side principal point position |
|---|---|---|---|---|---|
| GR1 | 1 | −30.634 | 28.727 | 1.922 | −31.751 |
| GR2 | 10 | 33.086 | 12.34 | −4.331 | −4.627 |
| GR3 | 16 | 73.461 | 2.485 | −1.36 | −0.315 |
| GR4 | 18 | −44.522 | 18.138 | −3.841 | −7.95 |

[Aberration of Zoom Lens]

Figure 14:
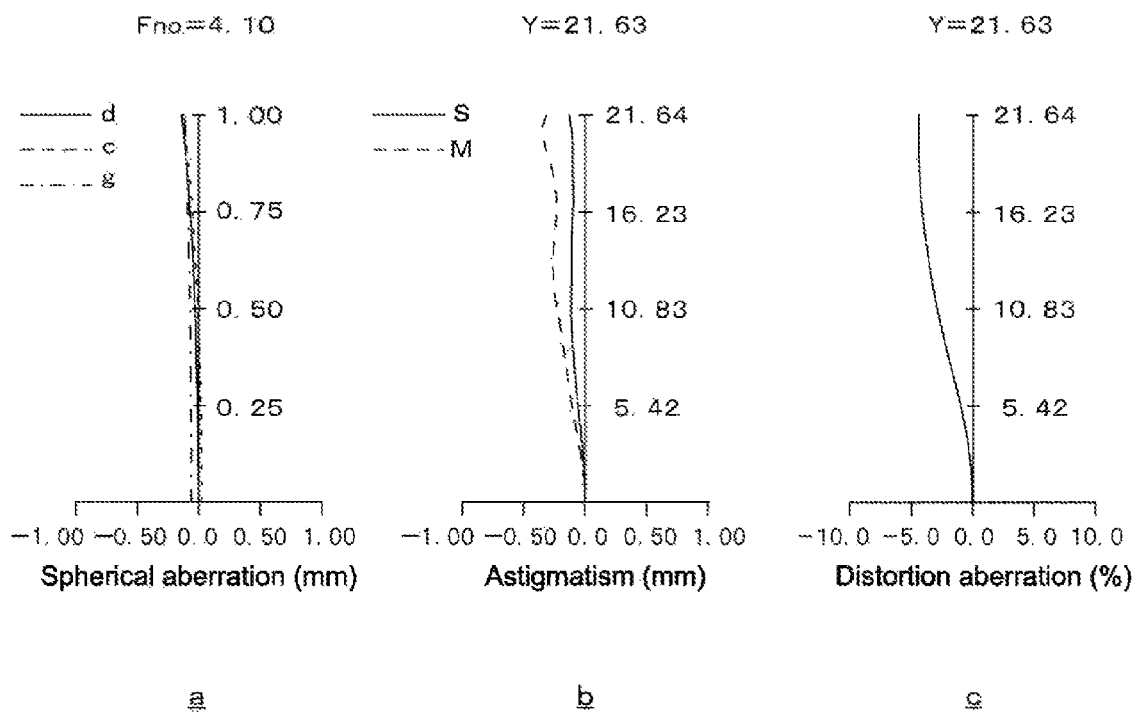
FIG. 14 is a diagram showing various aberrations in a wide-angle end of the zoom lens according to the fourth embodiment of the present technology.
Figure 15:
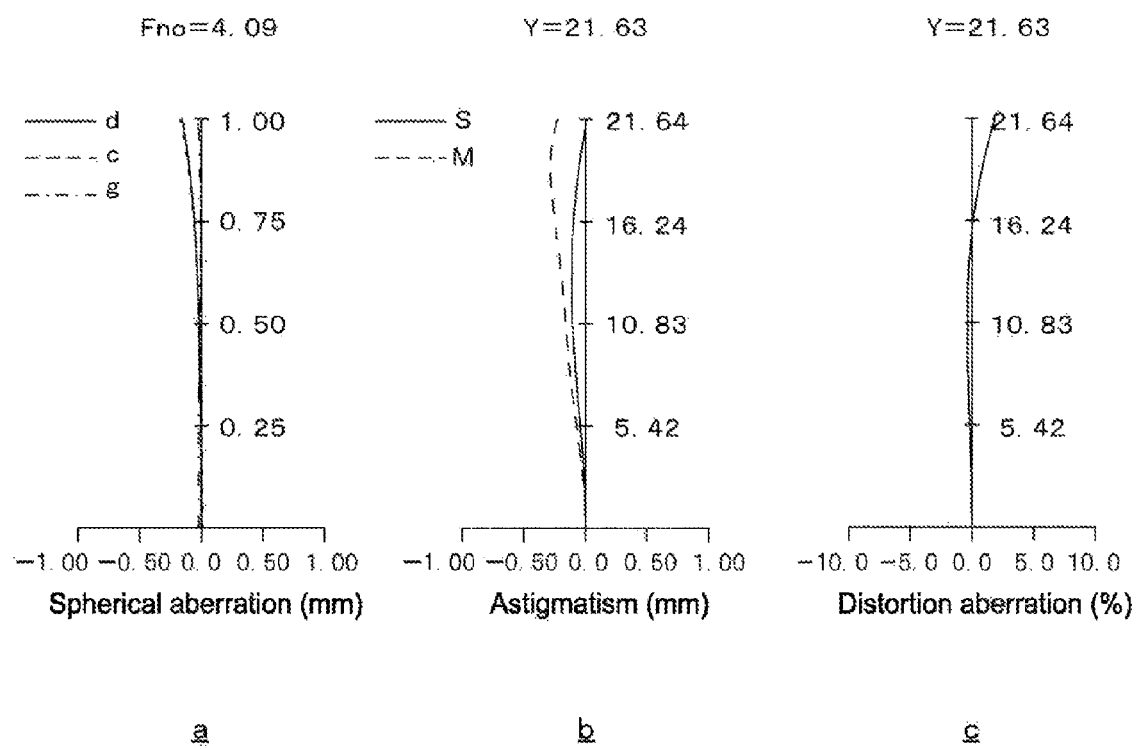
FIG. 15 is a diagram showing various aberrations in an intermediate focal length of the zoom lens according to the fourth embodiment of the present technology.
Figure 16:
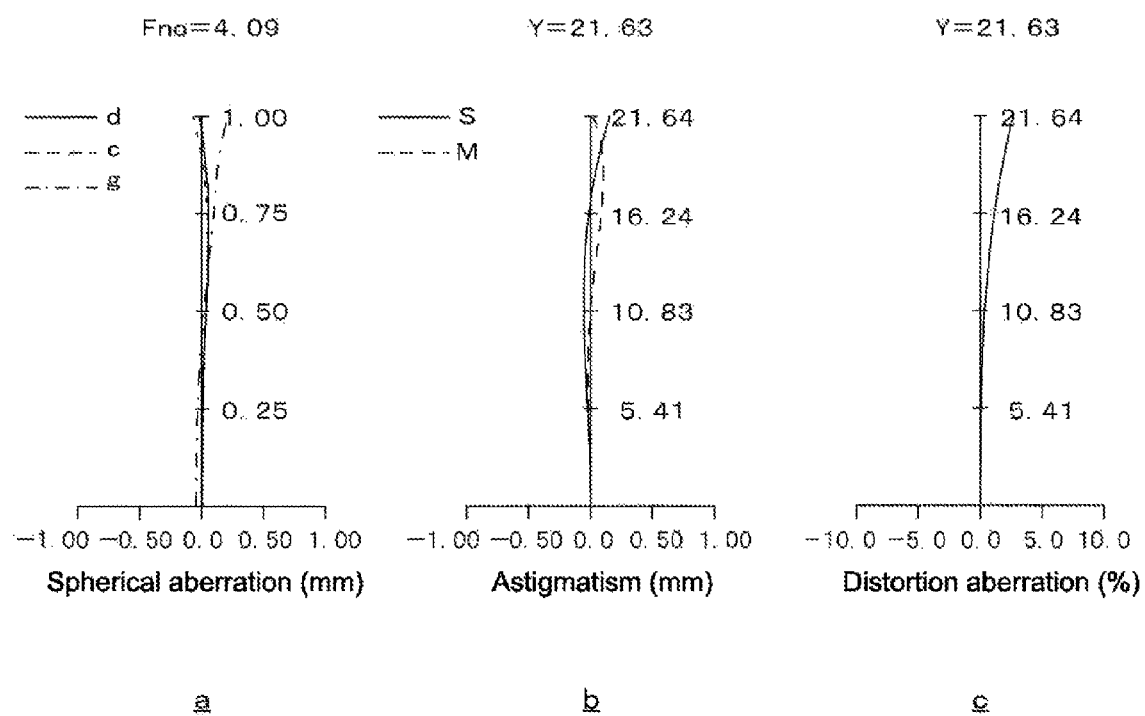
FIG. 16 is a diagram showing various aberrations in a telephoto end of the zoom lens according to the fourth embodiment of the present technology.

FIGS. 14 to 16 are diagrams showing various aberrations of the zoom lens according to the fourth embodiment of the present technology. FIG. 14 shows diagrams of various aberrations in a focus state in the wide-angle end. FIG. 15 shows diagrams of various aberrations in a focus state to the intermediate focal length between the wide-angle end and the telephoto end. FIG. 16 shows diagrams of various aberrations in a focus state in the telephoto end. In each of these diagrams, "a" represents a spherical aberration diagram, "b" represents an astigmatism diagram (image field curvature diagram), and "c" represents a distortion aberration diagram.

As is apparent from the aberration diagrams, the numerical example 4 achieves suitably correction of the various aberrations and has excellent imaging performance.

5. Fifth Embodiment

[Lens Configuration]

Figure 17:
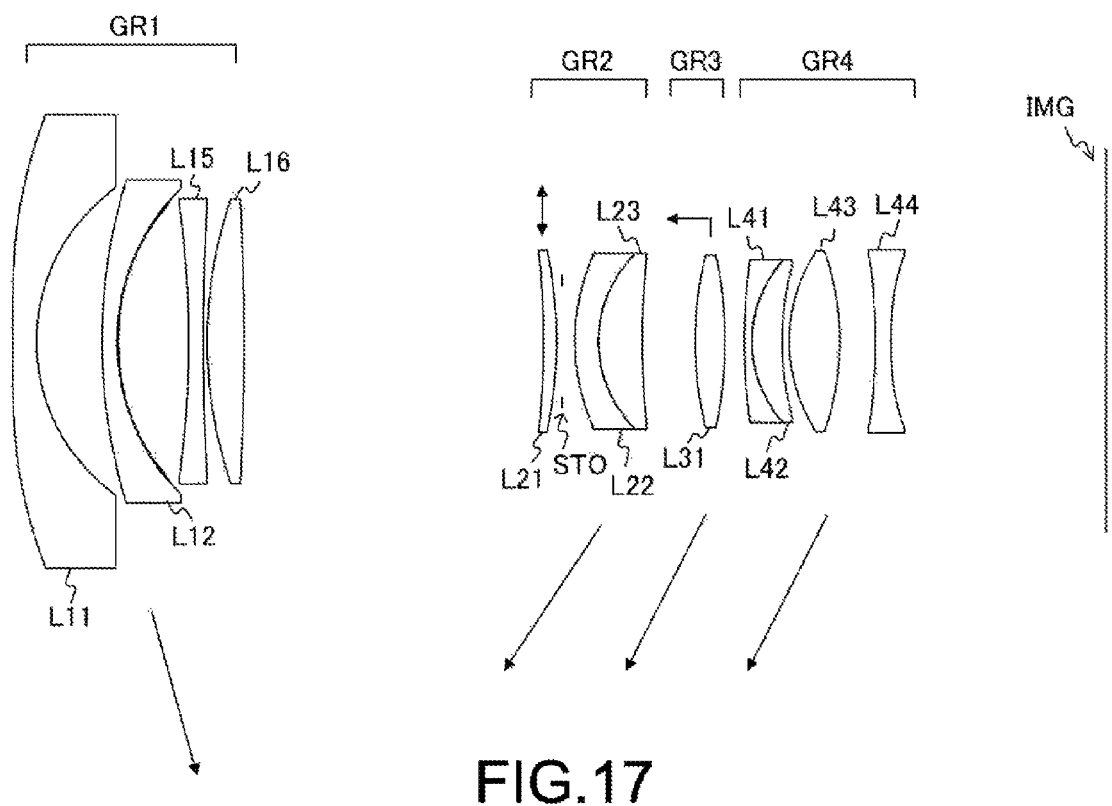
FIG. 17 is a diagram showing a lens configuration of a zoom lens according to a fifth embodiment of the present technology.

FIG. 17 is a diagram showing a lens configuration of a zoom lens according to a fifth embodiment of the present technology.

The zoom lens according to the fifth embodiment includes a first lens group GR1, a second lens group GR2, a third lens group GR3, and a fourth lens group GR4, arranged in order from an object side to an image surface IMG. The first lens group GR1 has a negative refractive power. The second lens group GR2 has a positive refractive power. The third lens group GR3 has a positive refractive power. The fourth lens group GR4 has a negative refractive power.

The first lens group GR1 includes a negative meniscus lens L11, a negative meniscus lens L12, a biconcave lens L15, and a biconvex lens L16, arranged in order from the object side. The negative meniscus lens L11 is a lens using aspherical surfaces for both surfaces with a convex surface facing to the object side. The negative meniscus lens L12 is a lens with a convex surface facing to the object side. This negative meniscus lens L12 is formed by attaching aspherical resin to a spherical surface of an image surface side. The biconcave lens L15 is a lens which has concave surfaces on both surfaces. The biconvex lens L16 is a lens having convex surfaces on both surfaces.

The second lens group GR2 includes a positive meniscus lens L21, a negative meniscus lens L22, and a positive meniscus lens L23, arranged in order from the object side. The positive meniscus lens L21 is a lens with a convex surface facing to the image side. The negative meniscus lens L22 is a lens using an aspherical surface for a surface of the object side with a convex surface facing to the object side. The positive meniscus lens L23 is a lens with a convex surface facing to the object side. The negative meniscus lens L22 and the positive meniscus lens L23 are bonded to each other to form a cemented lens.

The third lens group GR3 is constituted of a biconvex lens L31 having convex surfaces on both surfaces using aspherical surfaces at both sides.

The fourth lens group GR4 includes a negative meniscus lens L41, a positive meniscus lens L42, a biconvex lens L43, and a biconcave lens L44, arranged in order from the object side. The negative meniscus lens L41 is a lens with a convex surface facing to the object side. The positive meniscus lens L42 is a lens which faces a convex surface to the object side. The negative meniscus lens L41 and the positive meniscus lens L42 are bonded to each other to form a cemented lens. The biconvex lens L43 is a lens having convex surfaces on both surfaces. The biconcave lens L44 is a lens having concave surfaces on both surfaces using aspherical surfaces on surfaces at both sides.

In the zoom lens according to the fifth embodiment, all lens groups are moved in an optical axis direction upon zooming from a wide-angle end state to a telephoto end state.

Moreover, focusing from infinity to a near side is performed by moving the third lens group GR3 in the optical axis direction.

Upon occurrence of a hand-shake vibration, the positive meniscus lens L21 arranged closest to the object side of the second lens group GR2 as a vibration-proof lens is moved in a direction perpendicular to the optical axis, thereby correcting image blurring.

It should be noted that a stop STO is arranged between the positive meniscus lens L21 and the negative meniscus lens L22 in the second lens group GR2.

[Specification of Zoom Lens]

Table 17 shows lens data of a numerical example 5 in which specific numerical values are applied to the zoom lens according to the fifth embodiment.

| si | ri | di | ni | vi |
|---|---|---|---|---|
| 1(ASP) | 1500.000 | 2.800 | 1.77173 | 49.20 |
| 2(ASP) | 22.228 | 7.770 | | |
| 3 | 64.181 | 1.800 | 1.83945 | 42.70 |
| 4 | 25.233 | 0.150 | 1.53699 | 41.70 |
| 5(ASP) | 28.104 | 8.331 | | |
| 6 | −113.573 | 1.700 | 1.80831 | 46.50 |
| 7 | 249.690 | 0.500 | | |
| 8 | 51.905 | 4.361 | 2.00912 | 29.10 |
| 9 | −302.364 | (d9) | | |
| 10 | −98.545 | 1.530 | 1.57124 | 56.00 |
| 11 | −52.054 | 0.900 | | |
| 12(Stop) | Infinity | 1.300 | | |
| 13(ASP) | 23.898 | 2.800 | 1.74688 | 49.30 |
| 14 | 14.357 | 5.180 | 1.49845 | 81.50 |
| 15 | 95.071 | (d15) | | |
| 16(ASP) | 44.945 | 3.500 | 1.48914 | 70.30 |
| 17(ASP) | −51.348 | (d17) | | |
| 18 | 71.182 | 0.900 | 1.80831 | 46.50 |
| 19 | 14.291 | 3.529 | 1.49845 | 81.60 |
| 20 | 32.992 | 0.850 | | |
| 21 | 19.255 | 5.981 | 1.49845 | 81.60 |
| 22 | −32.092 | 4.240 | | |
| 23(ASP) | −56.794 | 1.814 | 1.77767 | 47.10 |
| 24(ASP) | 55.000 | (d24) | | |

Table 18 shows focal lengths f, F values Fno, half angle of views ω, and surface spacings in wide-angle ends, intermediate focal lengths, and telephoto ends according to the zoom lens of the fifth embodiment.

| | Wide-angle end | Intermediate focal length | Telephoto end |
|---|---|---|---|
| f | 16.48 | 24.00 | 33.95 |
| Fno | 4.13 | 4.12 | 4.13 |
| ω | 54.37 | 41.80 | 31.89 |
| d9 | 35.429 | 16.204 | 3.601 |
| d15 | 6.281 | 6.293 | 5.605 |
| d17 | 2.312 | 2.300 | 2.988 |
| d24 | 26.339 | 34.774 | 44.972 |

In the zoom lens according to the fifth embodiment, the following surfaces are formed to be aspheric: both surfaces (the first surface and the second surface) of the negative meniscus lens L11 of the first lens group GR1; an image side surface (the fifth surface) of the negative meniscus lens L12 of the first lens group GR1; an object side surface (the thirteenth surface) of the negative meniscus lens L22 of the second lens group GR2; both surfaces (the sixteenth surface and the seventeenth surface) of the biconvex lens L31 of the third lens group GR3; and both surfaces (the twenty-third surface and the twenty-fourth surface) of the biconcave lens L44 of the fourth lens group GR4.

Table 19 shows conic constants κ and the 4th-order, 6th-order, 8th-order, 10th-order, and 12th-order aspherical coefficients A4, A6, A8, A10 and A12 of the surfaces.

| si | κ | A4 | A6 | A8 | A10 | A12 |
|---|---|---|---|---|---|---|
| 1 | −1.0000 | 1.7955E−05 | −2.8604E−08 | 2.8048E−11 | −1.4614E−14 | 2.50000E−18 |
| 2 | −0.4638 | 5.9412E−06 | 3.3814E−08 | −7.6209E−11 | 5.5525E−14 | 0.00000E+00 |
| 5 | −0.7502 | 2.1512E−05 | −1.7084E−09 | −1.9909E−10 | 9.5084E−13 | −1.44331E−15 |
| 13 | 0.0000 | −7.6689E−06 | −2.4037E−03 | 1.1956E−10 | −5.1831E−13 | 0.00000E+00 |
| 16 | 0.0000 | 1.3381E−05 | −9.5036E−08 | 2.1730E−09 | −2.0542E−11 | 0.00000E+00 |
| 17 | 0.0000 | 3.9795E−06 | −1.3188E−07 | 1.9730E−09 | −1.9465E−11 | 0.00000E+00 |
| 23 | 0.0000 | 8.3247E−05 | −1.1417E−06 | 5.6960E−09 | −1.8041E−11 | 0.00000E+00 |
| 24 | 0.0000 | 1.2241E−04 | −9.9664E−07 | 4.9973E−09 | −1.1701E−11 | 0.00000E+00 |

Table 20 shows initial surfaces, focal lengths, entire lengths, front-side principal point positions, and rear-side principal point positions of the lens groups GR1 to GR4 according to the zoom lens of the fifth embodiment.

| | Initial surface | Focal length | Entire length | Front-side principal point position | Rear-side principal point position |
|---|---|---|---|---|---|
| GR1 | 1 | −30.131 | 27.413 | 1.62 | −28.772 |
| GR2 | 10 | 64.221 | 11.711 | 0.749 | −8.581 |
| GR3 | 16 | 49.589 | 3.5 | −1.11 | −1.268 |
| GR4 | 18 | −107.794 | 17.315 | −17.596 | 4.673 |

[Aberration of Zoom Lens]

Figure 18:
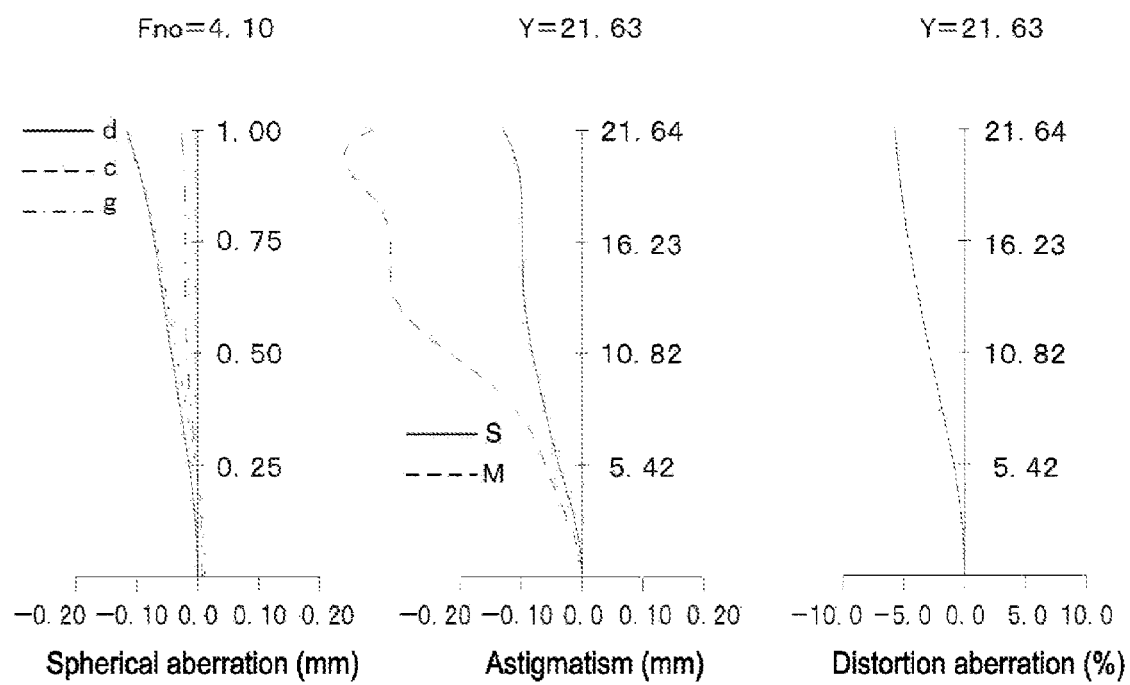
FIG. 18 is a diagram showing various aberrations in a wide-angle end of the zoom lens according to the fifth embodiment of the present technology.
Figure 19:
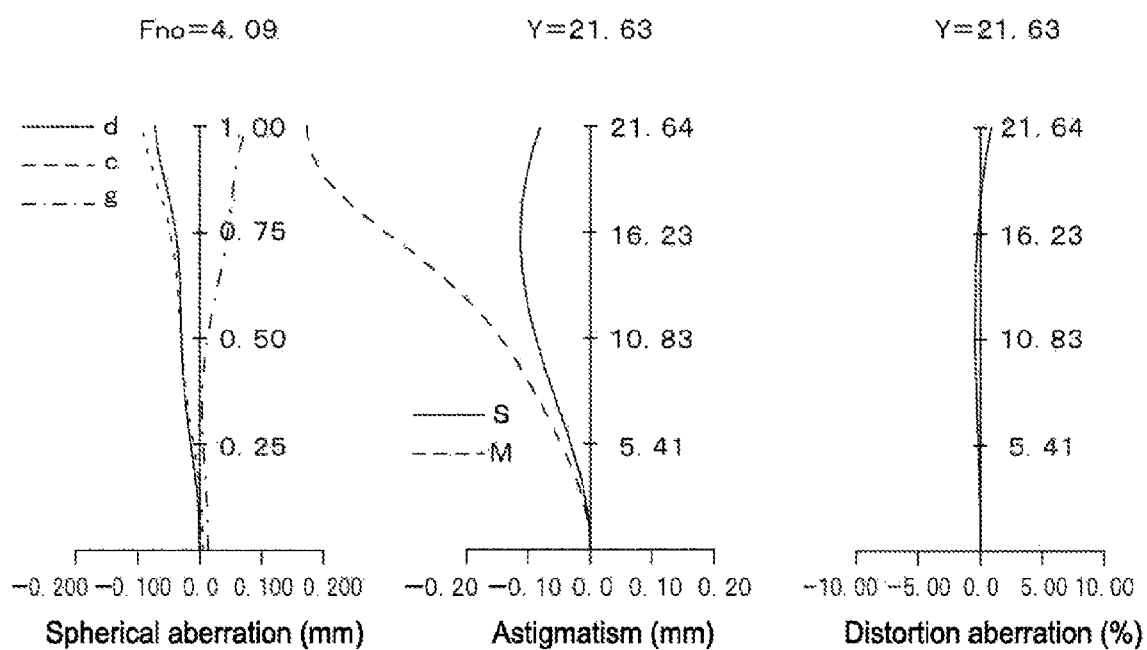
FIG. 19 is a diagram showing various aberrations in an intermediate focal length of the zoom lens according to the fifth embodiment of the present technology.
Figure 20:
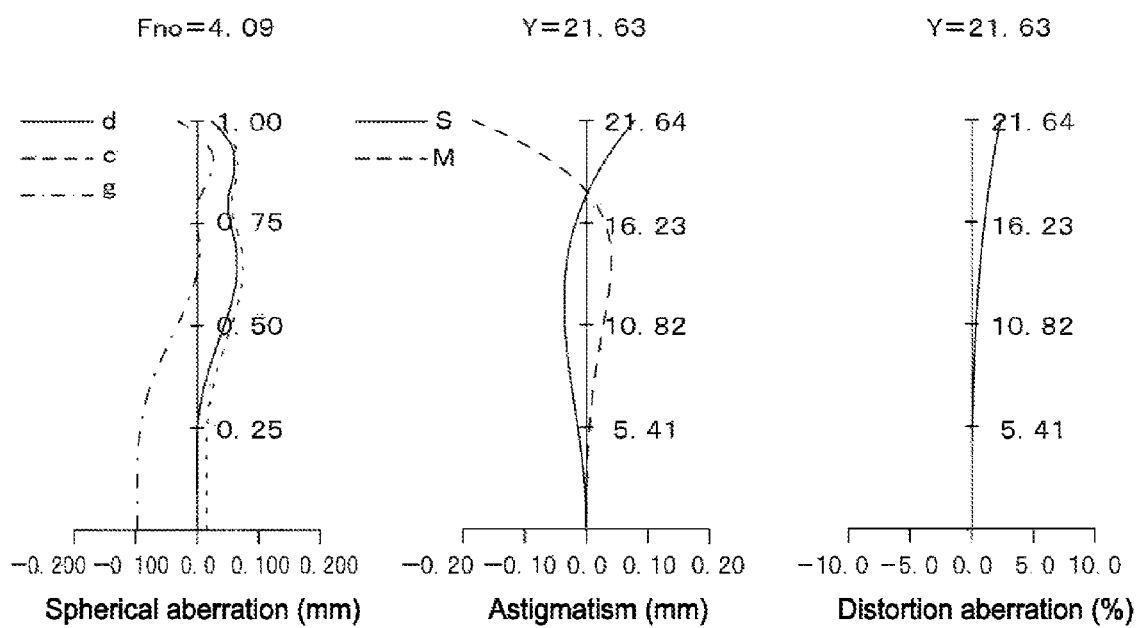
FIG. 20 is a diagram showing various aberrations in a telephoto end of the zoom lens according to the fifth embodiment of the present technology.

FIGS. 18 to 20 are diagrams showing various aberrations of the zoom lens according to the fifth embodiment of the present technology. FIG. 18 shows diagrams of various aberrations in a focus state in the wide-angle end. FIG. 19 shows diagrams of various aberrations in a focus state to the intermediate focal length between the wide-angle end and the telephoto end. FIG. 20 shows diagrams of various aberrations in a focus state in the telephoto end. In each of these diagrams, "a" represents a spherical aberration diagram, "b" represents an astigmatism diagram (image field curvature diagram), and "c" represents a distortion aberration diagram.

As is apparent from the aberration diagrams, the numerical example 5 achieves suitably correction of the various aberrations and has excellent imaging performance.

[Summary of Conditional Expressions]

Table 21 shows respective values of the numerical examples 1 to 5 according to the first to fifth embodiments of the present technology. As can be clearly seen from the values, the numerical examples are configured to satisfy the conditional equations (a) to (c).

| | First example | Second example | Third example | Fourth example | Fifth example |
|---|---|---|---|---|---|
| Conditional expression (a) $-2.0 < f3/f4 < -0.35$ | −0.67 | −0.66 | −1.20 | −1.65 | −0.46 |
| Conditional expression (b) $0.40 < f2/f3 < 1.5$ | 1.07 | 1.11 | 0.64 | 0.45 | 1.30 |
| Conditional expression (c) $-0.4 < (r1p + r2p)/(r1p - r2p) < 0.4$ | −0.06 | 0.27 | 0.09 | 0.22 | 0.02 |
| f3 | 50.54 | 50.16 | 60.96 | 73.46 | 49.59 |
| f4 | −75.80 | −76.01 | −50.80 | −44.52 | −107.79 |
| f2 | 53.89 | 55.87 | 39.25 | 33.09 | 64.22 |
| r1p | 20.48 | 119.52 | 22.96 | 26.49 | −56.79 |
| r2p | −23.19 | −68.70 | −19.00 | −17.04 | 55.00 |

6. Application Examples

[Configuration of Imaging Apparatus]

Figure 21:
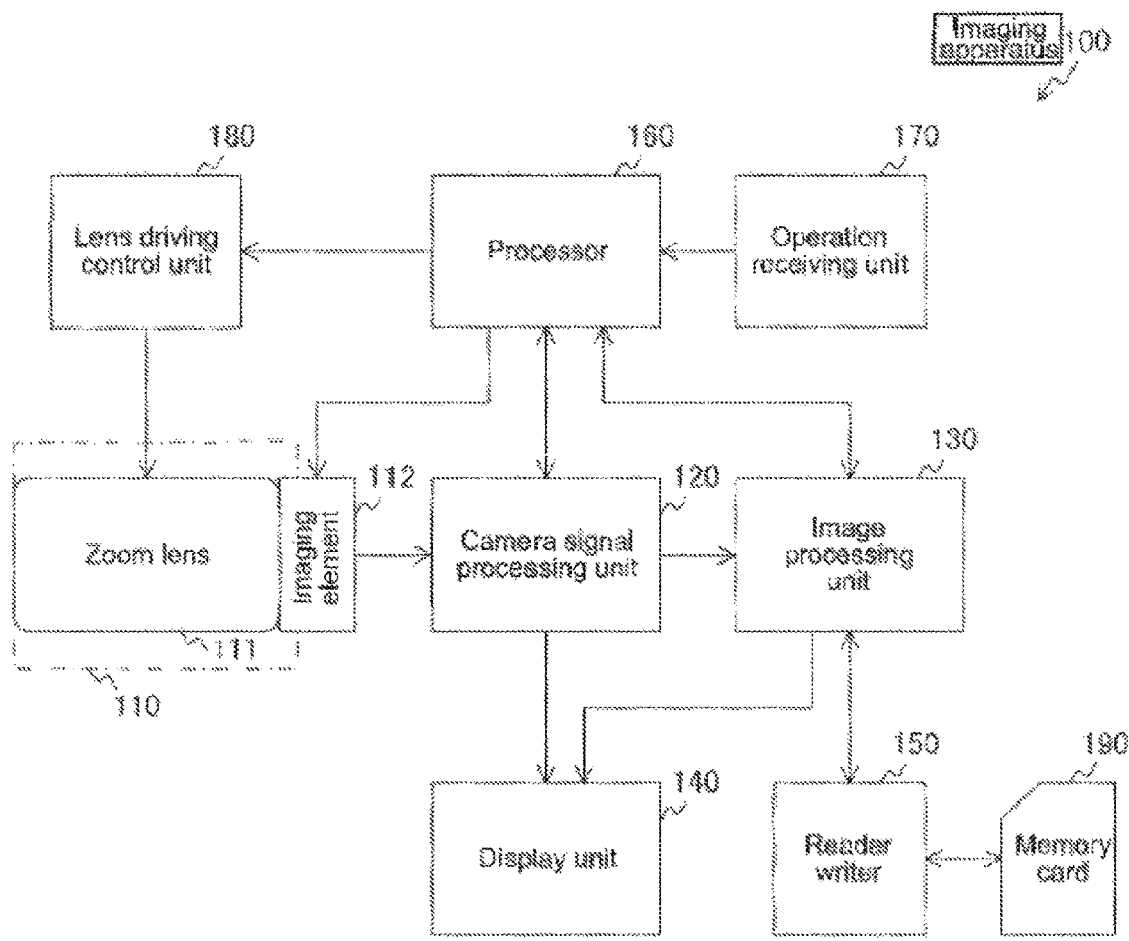
FIG. 21 is a diagram showing an example where the zoom lenses according to the first to fifth embodiments of the present technology are applied to an imaging apparatus 100.

FIG. 21 is a diagram showing an example in which the zoom lens according to the first embodiment to the fifth embodiment of the present technology is applied to an imaging apparatus 100. The imaging apparatus 100 includes a camera block 110, a camera signal processing unit 120, an image processing unit 130, a display unit 140, a reader writer 150, a processor 160, an operation receiving unit 170, and a lens driving control unit 180.

The camera block 110 has a function of capturing an image, and includes a zoom lens 111 according to the first to fifth embodiments and an imaging element 112 that converts an optical image, which is formed by the zoom lens 111, into an electric signal. As the imaging element 112, for example, it is possible to use a photoelectric conversion element such as a charge coupled device (CCD) or a complementary metal-oxide semiconductor (CMOS). Regarding the zoom lens 111, here, the lens groups of the first to fifth embodiments are shown in simplified form as a single lens.

The camera signal processing unit 120 performs signal processing such as analog-to-digital conversion processing on a captured image signal. The camera signal processing unit 120 converts an output signal, which is output from the imaging element 112, into a digital signal. Further, the camera signal processing unit 120 performs various signal processes such as noise removal, image quality correction, and conversion into luminance and chromatic difference signals.

The image processing unit 130 performs a process of recording and reproducing the image signal. The image processing unit 130 performs a process of coding for compression and decoding for decompression on an image signal based on a predetermined image data format, a process of conversion of data specification such as resolution, and the like.

The display unit 140 displays the captured image and the like. The display unit 140 has a function to display various kinds of data such as a condition of the operation performed through the operation receiving unit 170 and a captured image. The display unit 140 can be constituted by, for example, a liquid crystal display (LCD).

The reader writer 150 performs access for writing and reading the image signal on a memory card 190. The reader writer 150 writes image data, which is encoded by the image processing unit 130, into the memory card 190 and additionally reads the image data which is recorded on the memory card 190. The memory card 190 is, for example, a semiconductor memory which is removable from a slot connected to the reader writer 150.

The processor 160 controls the entire imaging apparatus. The processor 160 functions as a control processing unit to control all the circuit blocks within the imaging apparatus 100, and controls the circuit blocks on the basis of the operation instruction signals and the like from the operation receiving unit 170.

The operation receiving unit 170 receives an operation from a user. The operation receiving unit 170 is realized by, for example, a shutter release button for performing a shutter operation, a selection switch for selecting operation modes, and the like. The operation instruction signal, which is received through the operation receiving unit 170, is supplied to the processor 160.

The lens driving control unit 180 controls driving of the lenses disposed in the camera block 110. The lens driving control unit 180 controls a motor (not shown in the drawing) for driving the lenses of the zoom lens 111 on the basis of the control signal from the processor 160.

In the imaging apparatus 100, when the image capturing is in a standby state, an image signal of the image captured by the camera block 110 under the control of the processor 160 is output to the display unit 140 through the camera signal processing unit 120 so as to be displayed as a camera-through-image. Moreover, when the operation instruction signal for zooming is input from the operation receiving unit 170, the processor 160 outputs a control signal to the lens driving control unit 180 to move predetermined lenses within the zoom lens 111 on the basis of the control of the lens driving control unit 180.

When the operation receiving unit 170 receives a shutter operation, the captured image signal is output from the camera signal processing unit 120 to the image processing unit 130, is encoded for compression, and is converted into digital data of the predetermined data format. The converted data is output to the reader writer 150 and is written in the memory card 190.

Focusing is performed, for example, in a case where the shutter release button of the operation receiving unit 170 is pressed halfway or pressed fully for recording (photography). In this case, on the basis of the control signal received from the processor 160, the lens driving control unit 180 moves the predetermined lenses of the zoom lens 111.

In a case of reproduction of image data recorded in the memory card 190, the reader writer 150 reads out predetermined image data from the memory card 190 in response to the operation which is received through the operation receiving unit 170. Then, the readout image data is decoded for decompression by the image processing unit 130, and subsequently the reproduced image signal is outputted to the display unit 140, thereby displaying the reproduced image.

It should be noted that the embodiments have described the exemplary case where the imaging apparatus 100 according to the embodiment is applied to a digital camera, but the application range of the imaging apparatus 100 is not limited to the digital camera. It may also be widely applied to digital input/output apparatuses such as a digital video camera.

As described above, the embodiments of the present technology can achieve a compact wide-angle zoom lens having a short back focus while maintaining high imaging performance.

It should be noted that each of the embodiments described above is just an example for realizing the present technology, and the items of the embodiments respectively correspond to specific items of claims of the disclosure. Likewise, the specific items of the claims of the disclosure respectively correspond to the items of the embodiments of the present technology represented by the same names. However, the present technology is not limited to the embodiments, and may be embodied through various modifications of the embodiments without departing from the scope thereof. Moreover, the effects described in the present specification are merely exemplary and not limited, and may have other effects.

It should be noted that the present technology may have the following configurations.

(1) A zoom lens including: in order from an object side, a first lens group having a negative refractive power; a second lens group having a positive refractive power; a third lens group having a positive refractive power; and a fourth lens group having a negative refractive power, the fourth lens group having at least two positive lenses, the zoom lens satisfying a conditional expression (a) of $-2.0<f3/f4<-0.35$ where f3 indicates a focal length of the third lens group and f4 indicates a focal length of the fourth lens group.

(2) The zoom lens according to Item (1), satisfying a conditional expression (b) of $0.4<f2/f3<1.5$ where f2 indicates a focal length of the second lens group.

(3) The zoom lens according to Item (1) or (2), satisfying a conditional expression (c) of $-0.4<(r1p+r2p)/(r1p-r2p)<0.4$ where r1p indicates a radius of curvature of a surface of the object side of the positive lens arranged closest to an image surface side of the fourth lens group and r2p indicates a radius of curvature of a surface of the image surface side of the positive lens arranged closest to the image surface side of the fourth lens group.

(4) The zoom lens according to any one of Items (1) to (3), in which all lens groups are moved in an optical axis direction upon zooming from a wide-angle end state to a telephoto end state.

(5) The zoom lens according to any one of Items (1) to (4), in which the fourth lens group includes a negative lens, a positive lens, a positive lens, and a negative lens in order from the object side.

(6) The zoom lens according to any one of Items (1) to (4), in which the fourth lens group includes a negative lens, a positive lens, a positive lens, a positive lens, and a negative lens in order from the object side.

(7) A zoom lens including: in order from an object side, a first lens group having a negative refractive power; a second lens group having a positive refractive power; a third lens group having a positive refractive power; and a fourth lens group having a negative refractive power, the fourth lens group having one positive lens, the zoom lens satisfying a conditional expression (a1) of $-2.0<f3/f4<-0.40$ where f3 indicates a focal length of the third lens group and f4 indicates a focal length of the fourth lens group.

(8) The zoom lens according to Item (7), satisfying a conditional expression (b) of $0.4<f2/f3<1.5$ where f2 indicates a focal length of the second lens group.

(9) The zoom lens according to Item (7) or (8), satisfying a conditional expression (c) of $-0.4<(r1p+r2p)/(r1p-r2p)<0.4$ where r1p indicates a radius of curvature of a surface of the object side of the positive lens arranged closest to an image surface side of the fourth lens group and r2p indicates a radius of curvature of a surface of the image surface side of the positive lens arranged closest to the image surface side of the fourth lens group.

(10) The zoom lens according to any one of Items (7) to (9), in which all lens groups are moved in an optical axis direction upon zooming from a wide-angle end state to a telephoto end state.

(11) The zoom lens according to any one of Items (7) to (10), in which the fourth lens group includes a negative lens, a positive lens, a positive lens, and a negative lens in order from the object side.

(12) The zoom lens according to any one of Items (7) to (10), in which the fourth lens group includes a negative lens, a positive lens, a positive lens, a positive lens, and a negative lens in order from the object side.

(13) The zoom lens according to any one of Items (1) to (12), further including a lens having substantially no lens power.

(14) An imaging apparatus, including: a zoom lens; and an imaging element configured to convert an optical image formed by the zoom lens into an electric signal, the zoom lens including, in order from an object side, a first lens group having a negative refractive power, a second lens group having a positive refractive power, a third lens group having a positive refractive power, and a fourth lens group having a negative refractive power, the fourth lens group having at least two positive lenses, the zoom lens satisfying a conditional expression (a) of $-2.0<f3/f4<-0.35$ where f3 indicates a focal length of the third lens group and f4 indicates a focal length of the fourth lens group.

(15) The imaging apparatus according to Item (14), further including a lens having substantially no lens power.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens, comprising: in order from an object side,
a first lens group that has a negative refractive power;
a second lens group that has a positive refractive power;
wherein a stop is arranged between a positive lens of the second lens group and a negative lens of the second lens group,
a third lens group that has a positive refractive power; and
a fourth lens group that has a negative refractive power,
wherein the fourth lens group has at least two positive lenses, and the zoom lens is configured to satisfy:
a first conditional expression
(a) of $-2.0<f3/f4<-0.35$
where f3 indicates a focal length of the third lens group and f4 indicates a focal length of the fourth lens group, and
a second conditional expression
(b) of $0.4<f2/f3<1.5$
where f2 indicates a focal length of the second lens group.

2. The zoom lens according to claim 1, wherein the zoom lens is further configured to satisfy a third conditional expression
(c) of $-0.4<(r1p+r2p)/(r1p-r2p)<0.4$
where r1p indicates a radius of curvature of a surface of the object side of a positive lens of the at least two positive lenses of the fourth lens group, arranged closest to an image surface side of the fourth lens group and r2p indicates a radius of curvature of a surface of the image surface side of the positive lens of the at least two positive lenses of the fourth lens group, arranged closest to the image surface side of the fourth lens group.

3. The zoom lens according to claim 1, wherein all of the first lens group, the second lens group, the third lens group, and the fourth lens group are configured to be moved along an optical axis direction upon zooming from a wide-angle end state to a telephoto end state.

4. The zoom lens according to claim 1, wherein the fourth lens group includes a first negative lens, a first positive lens, and a second positive lens of the at least two positive lenses, and a second negative lens in order from the object side.

5. The zoom lens according to claim 4, wherein the fourth lens group further includes the first negative lens, the first positive lens, the second positive lens, a third positive lens, and the second negative lens in order from the object side.

6. A zoom lens, comprising: in order from an object side, a first lens group that has a negative refractive power; a second lens group that has a positive refractive power; a third lens group that has a positive refractive power; and a fourth lens group that has a negative refractive power, wherein the fourth lens group includes a first negative lens, a first positive lens, a second positive lens, and a second negative lens in order from the object side, wherein the zoom lens is configured to satisfy:
a first conditional expression
  (a1) of $-2.0 < f3/f4 < -0.40$
where f3 indicates a focal length of the third lens group, and f4 indicates a focal length of the fourth lens group.

7. The zoom lens according to claim 6, wherein the zoom lens is further configured to satisfy a second conditional expression
  (b) of $0.4 < f2/f3 < 1.5$
   where f2 indicates a focal length of the second lens group.

8. The zoom lens according to claim 6, wherein the zoom lens is further configured to satisfy a third conditional expression
  (c) of $-0.4 < (r1p+r2p)/(r1p-r2p) < 0.4$
where r1p indicates a radius of curvature of a surface of the object side of the second positive lens arranged closest to an image surface side of the fourth lens group and r2p indicates a radius of curvature of a surface of the image surface side of the second positive lens arranged closest to the image surface side of the fourth lens group.

9. The zoom lens according to claim 6, wherein all of the first lens group, the second lens group, the third lens group and the fourth lens group are configured to be moved along an optical axis direction upon zooming from a wide-angle end state to a telephoto end state.

10. The zoom lens according to claim 6, wherein the fourth lens group further includes the first negative lens, the first positive lens, the second positive lens, a third positive lens, and the second negative lens in order from the object side.

11. An imaging apparatus, comprising:
a zoom lens; and
an imaging element configured to convert an optical image formed by the zoom lens into an electric signal, wherein the zoom lens includes, in order from an object side:
a first lens group that has a negative refractive power,
a second lens group that has a positive refractive power, wherein a stop is arranged between a positive lens of the second lens group and a negative lens of the second lens group,
a third lens group that has a positive refractive power, and
a fourth lens group that has a negative refractive power, wherein the fourth lens group has at least two positive lenses, and the zoom lens is configured to satisfy:
a first conditional expression
  (a) of $-2.0 < f3/f4 < -0.35$
   where f3 indicates a focal length of the third lens group and f4 indicates a focal length of the fourth lens group, and
a second conditional expression
  (b) of $0.4 < f2/f3 < 1.5$
   where f2 indicates a focal length of the second lens group.

* * * * *